United States Patent [19]
Nozawa et al.

[11] Patent Number: 5,805,272
[45] Date of Patent: Sep. 8, 1998

[54] IMAGE READING APPARATUS FOR BOOK-LIKE DOCUMENT OR THE LIKE

[75] Inventors: Tatsuji Nozawa, Toyokawa; Haisheng Liang, Takatsuki; Hiroshi Ootsuka; Alan Darby, both of Toyokawa; Hideo Muramatsu, Shinsiro; Shinya Matsuda, Kyoto, all of Japan

[73] Assignee: Minolta Co., Ltd., Osaka, Japan

[21] Appl. No.: 754,828

[22] Filed: Nov. 22, 1996

[30] Foreign Application Priority Data

Nov. 24, 1995 [JP] Japan ................................. 7-329666
Oct. 31, 1996 [JP] Japan ................................. 8-307401

[51] Int. Cl.⁶ .................................................. H04N 1/00
[52] U.S. Cl. ........................................ 355/25; 358/474
[58] Field of Search ........................ 399/51, 52, 365, 399/376; 355/25, 68, 75; 358/464, 415, 474

[56] References Cited

U.S. PATENT DOCUMENTS

| | | | |
|---|---|---|---|
| 5,084,611 | 1/1992 | Okisu et al. | 250/208.1 |
| 5,194,729 | 3/1993 | Okisu et al. | 250/222.1 |
| 5,416,609 | 5/1995 | Matsuda et al. | 358/474 |
| 5,616,914 | 4/1997 | Matsuda | 358/474 X |

FOREIGN PATENT DOCUMENTS 5-110757   4/1993   Japan .

Primary Examiner—Joan H. Pendegrass
Attorney, Agent, or Firm—McDermott, Will & Emery

[57] ABSTRACT

An image reading apparatus which reads out a document placed face-up by scanning optically from above the document, having a document change detection means, and when a document is not changed, a reproduced image density is controlled by using a previous result of the document ground brightness detection without detecting newly. Further, an image reading section is arranged on a document table which a bookform document is placed upward and an auto-document feeding unit for conveying a sheetform document is provided, where by a conveyed sheetform document is read out by a sensor at a fixed focal position.

18 Claims, 27 Drawing Sheets

F I G. 4
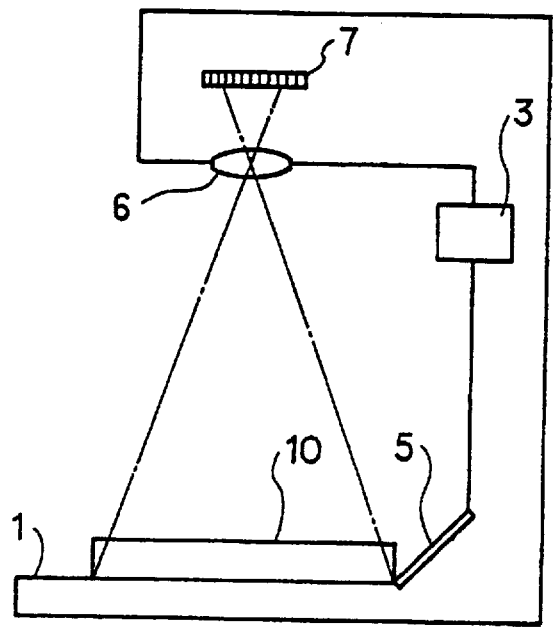
F I G. 5
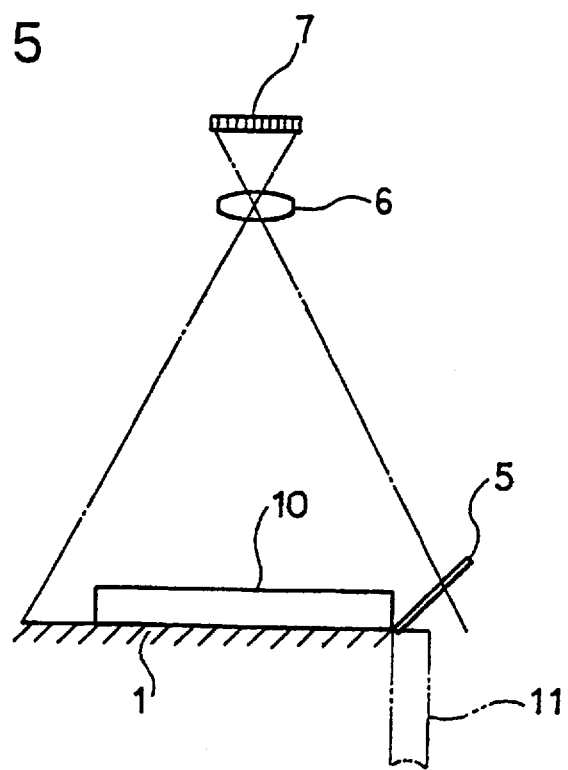

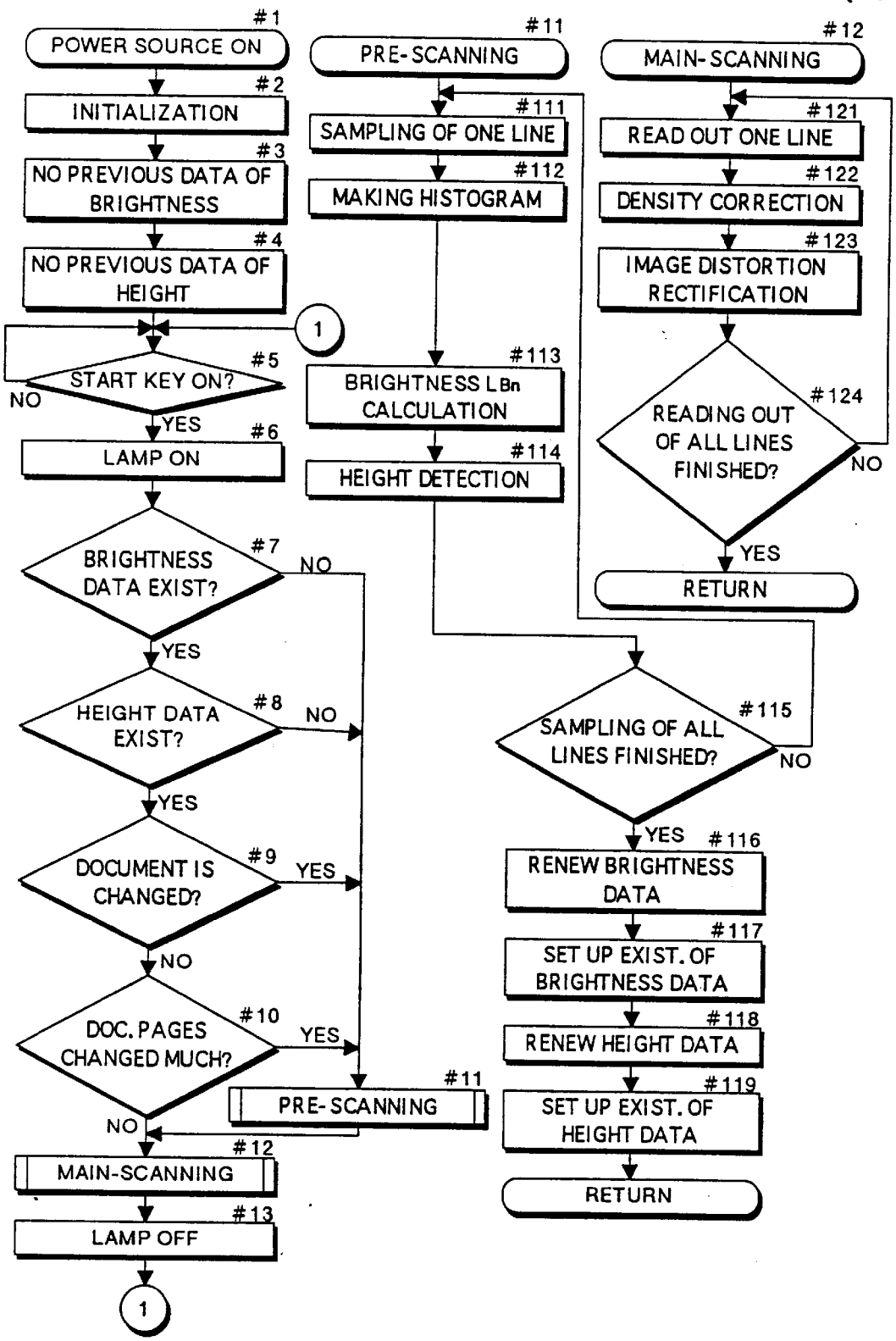

F I G. 1 5
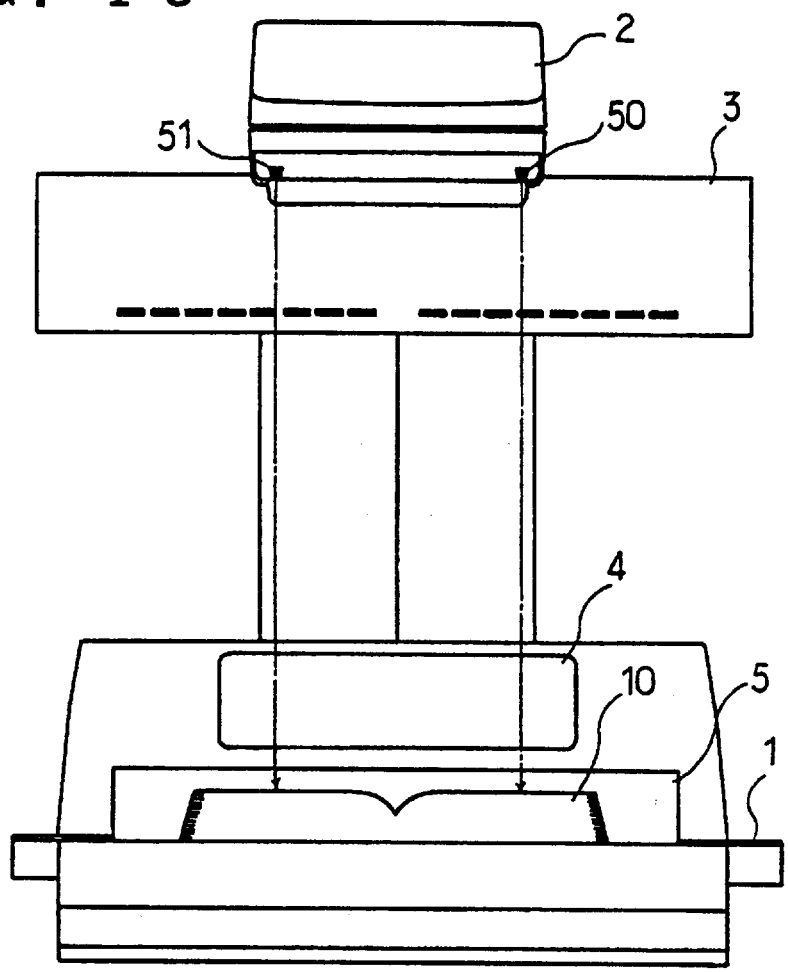

IMAGE READING APPARATUS FOR BOOK-LIKE DOCUMENT OR THE LIKE

BACKGROUND OF THE INVENTION

1. Field of the Invention

The present invention relates to an image reading apparatus which reads out book-like document and the like placed face-up on a document table by an optical scanning above a document table, and more particularly to an image reading apparatus which is capable of correcting reproduced image density automatically in accordance with a density of document ground.

2. Description of the Related Art

It is conventionally known that an image reading apparatus which detects a distribution of density of the document ground by use of a brightness histogram, controls γ-conversion coefficient based on the distribution of reproducing an image, and adjusts to an optimal image density.

Further, the present applicant has applied for a patent concerning a technical method to detect an abnormality of a ground brightness data and to correct the same by use of correlation of information of document ground brightness and information of document height. Further, the applicant has applied for a patent concerning to a technical method to detect an abnormality of document height data and to correct the same by use of correlation of information of document height detected just before hand (both applications are not known in public).

In the above-mentioned apparatus which adjusts to an of an image density can not be executed correctly when pictorial area exists in a part of a page to be imaged.

Moreover, in the technical method to correct a data by use of correlation of document height information according to the above-mentioned application for a patent, as a correlation factor varies because of a degree of glossiness on a document surface and the like, it has been difficult to improve the accuracy of the correction more than a certain level. Furthermore, in the technical method to detect a abnormality of the latest data and to correct the data by use of the data detected just beforehand, as the detecting operation is repeated at every image reading, it has a problem of taking a time for image reading.

Further, in a conventional image reading apparatus, as a document surface to be read out is placed face-down by pushing down with a document hold plate, the document needs to be reversed and its pages also need to be turned over one by one when a bookform document is read out by turning over its pages, thus the operation is ineffective, moreover, there has been a problem that a bookform document tends to be damaged. To solve these problems, there has been proposed an image reading apparatus, wherein a bookform document or a sheetform document is placed face-up manually, and the document surface is read out by an optical scanning above the document.

However, according to the above-mentioned image reading apparatus wherein a document is placed face-up, there has been a problem that when a plural paper of a sheetform document is copied, there is no option but to put a document manually such as a conventional image reading apparatus wherein a document is placed face-down.

SUMMARY OF THE INVENTION

It is an object of the present invention is to provide an image reading apparatus in which an image reading time and a document brightness detecting operation is to be reduced and a proper image reproduction is to be executed. Wherein the apparatus, a brightness detection is not executed if it is judged that the same document is on the document table, and height variation is within a certain degree, and an image density reproduced is controlled by using the result of brightness detection just beforehand.

In accordance with the invention, therefor, there is provided an image reading apparatus which reads a document surface placed face-up on a document table, and controls an image density based on document ground brightness data obtained by reading the document, and said image reading apparatus, comprising: an image pickup device for picking up a document; a main-scanning means for reading out the document by scanning of the image pickup device, and outputting the image data; a pre-scanning means for reading out the document by scanning of the image pickup device before the main-scanning operation, and obtaining a data of document ground brightness; a memory means for memorizing the ground brightness data obtained by the pre-scanning means; a document change detection means for detecting whether a document is changed or not; a density control means for controlling a density of the image obtained by the main-scanning means based on the ground brightness data memorized in the memory means; and a control means for controlling the pre-scanning means and a memory means so that a pre-scanning is not executed and the data memorized in the memory means is not renewed when a document change is not detected by the document change detection means, and so that a pre-scanning is executed and the data memorized in the memory means is renewed when a document change is detected by the document change detection means. A page turned detection means can be substituted for the document change detection means.

It is another object of the present invention is to provide an image reading apparatus in which a plural sheetform document placed face-up is able to be copied easily and fast by auto-continuous reading. Wherein the apparatus, having a fixed focal position for auto-feeding of a sheetform document, a lens is driven to a focal position in accordance with a kind of a document to be read out and the document position by use of the same image pickup device. Thus, it is able to copy a sheetform document continuously by use of the same image reading sensor, in addition to an auto-focusing copy for a bookform document placed manually and a fixed focal position for an auto-feeding of a sheetform document.

In accordance with the invention, there is provided an image reading apparatus which reads out a bookform document and a sheetform document, and outputs the image data of the same, and said image reading apparatus comprising: an image pickup device for picking up the document image; an auto-document feeder for feeding a sheetform document to a document reading position; a main-scanning means for reading out the document by scanning of the image pickup device, and outputting the image data; a pre-scanning means for reading out the document by scanning of the image pickup device before the main-scanning operation, and obtaining a correction data; a memory means for memorizing the correction data obtained by the pre-scanning operation; an image rectification means for rectifying the image data obtained by the main-scanning operation based on the correction data; a document judgment means for judging whether a document is sheetform or bookform; and, a control means for controlling the pre-scanning means whether a pre-scanning is to be executed or not in accordance with a kind of a document that is judged by the document judgment means.

BRIEF DESCRIPTION OF THE DRAWINGS

FIG. 4 is a side view showing a schematic construction of the apparatus, FIG. 5 is a view showing a principle process of document height detection according to the first embodiment, FIG. 14(a), FIG. 14(b), and FIG. 14(c) are flowcharts showing a processing of a CPU on photographing according to the image reading apparatus, FIG. 15 is a front view of the image reading apparatus with a page turned detection sensor.

DETAILED DESCRIPTION OF THE PREFERRED EMBODIMENTS OF THE PRESENT INVENTION

An image reading apparatus according to the first embodiment of the present invention will be described with reference to the accompanying drawings.

Figure 1:
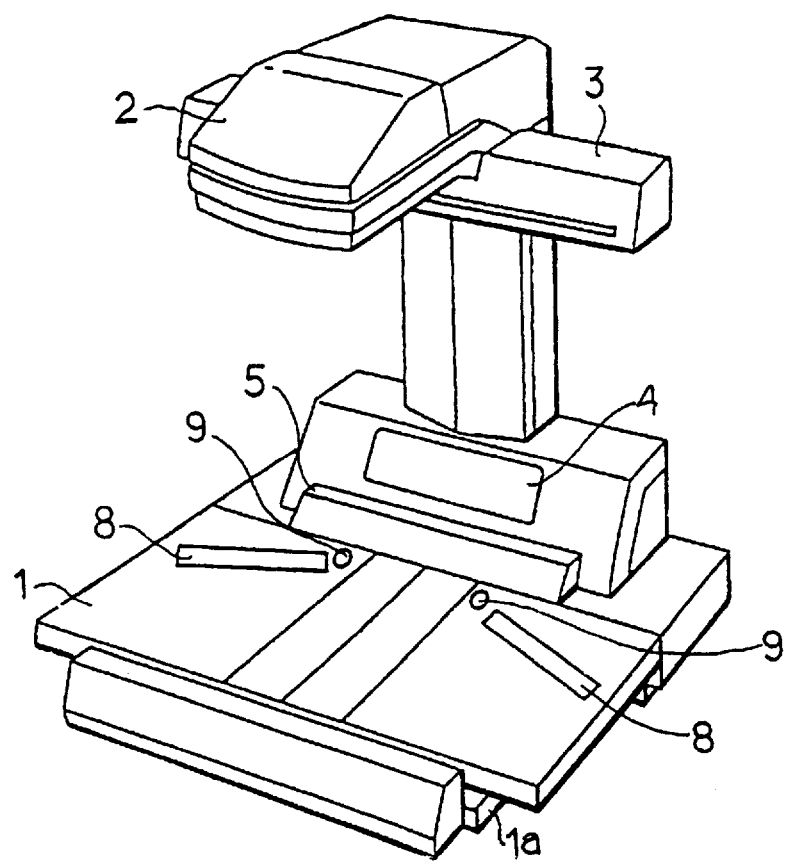
FIG. 1 is a perspective view showing an overall construction an image reading apparatus of the first embodiment according to the present invention.
Figure 2:
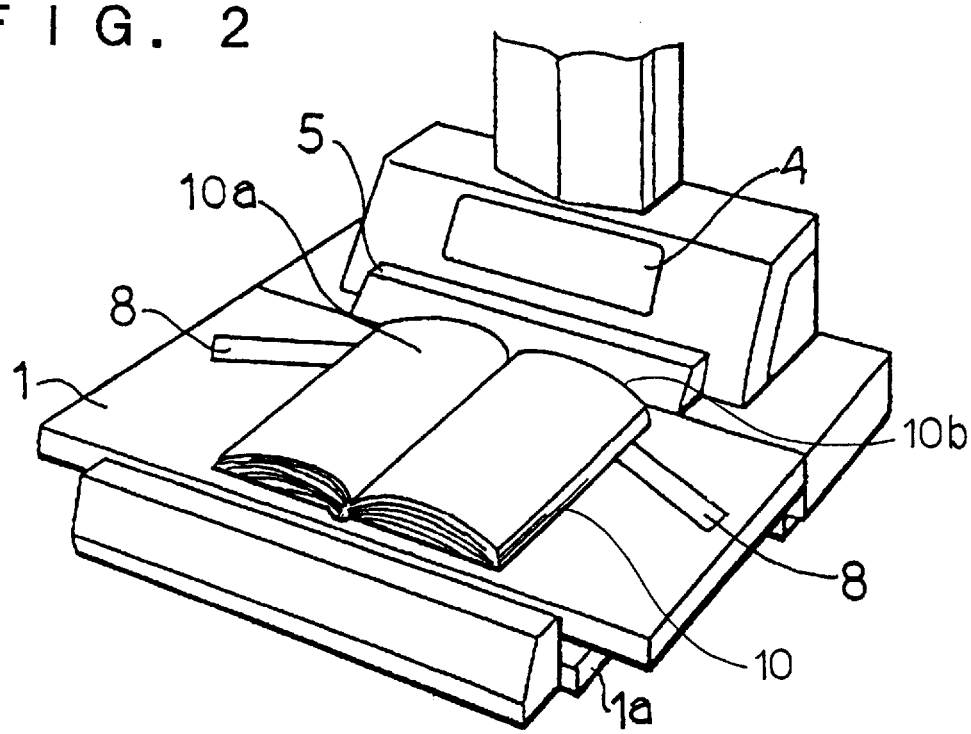
FIG. 2 is a perspective view showing a state that a book is set on a document table of the apparatus, FIG. 3 a front view showing a schematic construction of the apparatus.

FIG. 1 shows an overall construction of the image reading apparatus. FIG. 2 shows a state that a book as an object is set on a document table of the apparatus. A document 10 such as books or files and the like (hereinafter refer to "bookform document") is opened and placed face-up on the document table 1. An image reading unit 2 having a line sensor is provided above the document table 1, and reads the opened page of a bookform document 10 by an optical scanning. The document table 1 is colored thicker than the ground color of an ordinary document, so that the document surface can be distinguished from the document table when the bookform document 10 is read in a background of the document table surface. The image reading apparatus comprises: an illumination unit 3 which is arranged rearward above the document table 1 and illuminates a bookform document 10 on the document table 1, an operation panel 4 for setting conditions of image reading and the like, a mirror 5 which is disposed rearward and aslant at the document table 1 and for detecting the document height by imaging the upper side surface of the bookform document 10, and a control unit (not shown) for controlling image reading operations such as pre-scanning operation and main-scanning operation of the image reading unit 2. Further, the bookform document 10 is set along the lower edge of the mirror 5 in order to decide a position of the document 10. Accordingly, a boarder between the document table 1 and the mirror 5 becomes basic position of document.

An image data read out by the image reading unit 2 is to be output to desired output apparatus (printer, computer and the like) by being processed in various proceedings at the control unit. Further, a start key 8 which executes to start reading operation of the apparatus and a document change detection sensor 9, which detects whether a document is changed or not, are embedded on the document table 1. The document change detection sensor 9 is composed of a pair of light emitting element and light receiving element, and when the bookform document 10 is set on the document table 1, light from the light emitting element is reflected on backside of the bookform document 10 and it is to be incident to the light receiving element. It is judged whether a document is on the document table or not based on whether the light receiving element is detecting a light. The detection whether a document is changed or not is executed by detecting that detecting light by the light receiving element breaks off from previous image reading to this time image reading.

The start key 8 and the document change detection sensor 9 are disposed on right side of the document table 1 and left side of the same respectively. The document change detection sensor 9 is not only arranged in the above-construction, but it may be arranged so that a document is set between light emitting elements and light receiving elements. For example, light emitting elements are arranged on the image reading unit 2, and light receiving elements are arranged on a position of the document table 1 where light from the light emitting elements is incident. In this case, it is judged that any documents are not set on the document table when the light receiving element is detecting a light, and it is judged that a document is set when the light receiving element is not detecting a light since a light to the light receiving elements are shut out when a document is set. Moreover, a mechanical micro switch or a supersonic waves sensor may be used for detection whether a document is changed. Further, the document table 1 is disposed on a document table base 1a, and its right plate of the document table 1 and its left plate of the same are independent, and they are designed as to be movable for longitudinal direction. Now, some terms are defined regarding parts of the bookform document 10 set on the document table 1. An overall of right and left pages of an opened bookform document 10, a plane which is read out by the image reading unit 2, is defined as a document surface 10a, and a rearward of the bookform document 10 is defined as a document upper side plane 10b.

Figure 3:
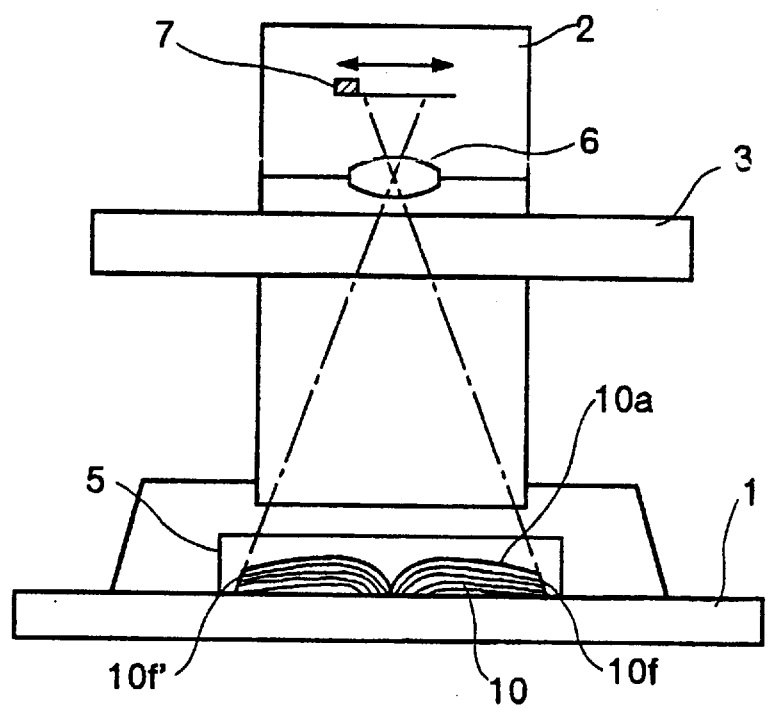

FIG. 3 is a front view of schematic structure of the present invention, and FIG. 4 is a side view of the same. The image reading unit 2 comprises a CCD line sensor 7 wherein a plural image pickup elements are arranged in a row from front side of the image reading apparatus to backside of the same (in main-scanning direction) and an optical system having a photographing lens 6 which projects an image of the document surface 10a on the line sensor 7. The line sensor 7 reads out an image of the document surface 10a by moving in sub-scanning direction (direction shown with an arrow in FIG. 3), which is in perpendicular to main-scanning direction, on an imaging plane wherein an image of the document surface 10a is imaged. The photographing lens 6 is arranged as to be movable according to direction of an optical axis by a driving device of a lens drive circuit 23 (refer to FIG. 8), and it is shifted in accordance with the height of a bookform document 10, which is obtained by a height detection as mentioned later, and then it images an image of the document surface 10a on the line sensor in-focus state at all times. A mirror 5 for height detection is disposed at rearward of the document table 1, extending to sub-scanning direction and inclined in 45° against document holding plane of the document table 1 as to image a document upper side plane 10b set on the document table 1. The document upper side plane 10b imaged on the mirror 5 is projected to the line sensor 7 accompanying the document surface 10a by the photographing lens 6. The line sensor 7 has enough length to read out an image on the projected document surface 10a and the document upper side plane 10b, and it reads out images of the document surface 10a and the document upper side plane 10b simultaneously by scanning movement. Although a line sensor is used in the present embodiment, an area sensor may be used instead.

When an opened bookform document 10 is set on the document table 1 upward, the shape of its document surface 10a is curved for height direction spacially. Therefore, it needs to detect the height of the bookform document 10 at respective positions in sub-scanning direction, and adjust a distortion of the read out image and focusing state of the image which is imaged on the line sensor 7.

FIG. 5 is a view showing principle proceedings of height detection according to the present embodiment. When a bookform document 10 is set on the predetermined position, a mirror image 11 of the document upper side plane 10b is imaged on a mirror 5, and a distribution of height of the bookform document 10 is detected by that the line sensor 7 reads out the mirror image 11 of the document upper side plane 10b projected on the mirror 5.

Figure 6:
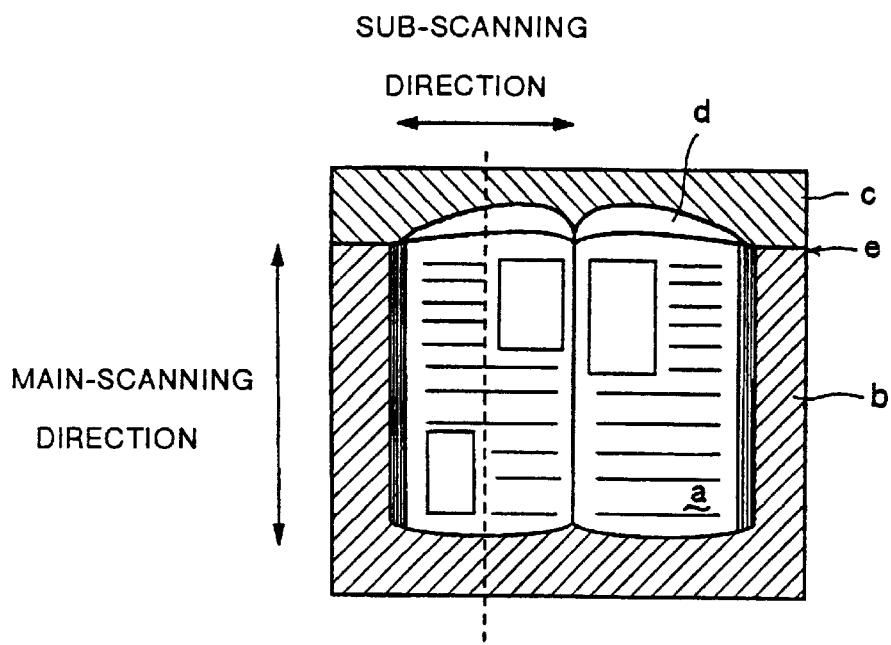
FIG. 6 is a view showing a state of an image data read by an image reading device.

FIG. 6 shows a state of an image data which is read by the image reading unit 2 with above-mentioned structure. In the figure, "a" is an image of a document surface 10a, "b" is an image of a document table 1, "c" is an image of a ground projected on a mirror 5, "d" is an image of upper side plane of bookform document 10 projected on the mirror 5, and "e" is a basic position of a document. The image "a" of a document surface and the image "d" of a document upper side plane 10b are read as they are curved for main-scanning direction because of a variation of the document height. Generally, as a document surface and upper side plane is almost white paper, they are read out as white. On the contrary, a document table 1 which is colored thicker than a document ground color and an image "c" of the background projected on the mirror 5 are read out as black because of small amount of reflected light.

Figure 7:
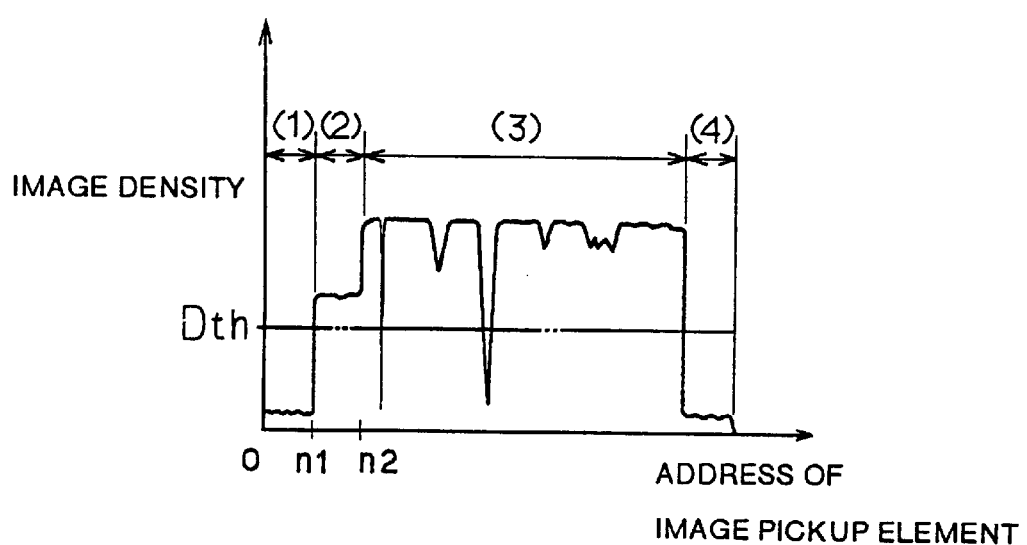
FIG. 7 is a view showing a state of output of one line in main-scanning direction read by a line sensor.

FIG. 7 shows a state of an output of one line in main-scanning direction, which is read out by the line sensor 7. In this example, it is a case that an image lies in a position shown in dotted line in FIG. 6 is read out by the line sensor 7. The lateral axis shows an address of the image pickup element of the line sensor 7, and the longitudinal axis shows an output of each picture element (density of an image). In the figure, (1), (2), (3), and (4) show zones of each image on the image pickup devices; (1) is a zone of an image "c" of a document's ground projected on the mirror 5, (2) is a zone of an image "d" of a document upper side plane projected on the mirror 5, (3) is a zone of an image "a" of a document surface 10a, and (4) is a zone of an image "b" of a document table 1. "Dth" is a predetermined threshold value which detects either an document image or other image. "n1" is a minimum address value of image pickup device output exceeding threshold value "Dth" i.e., a value showing an upper end image position of mirror image 11 of the document upper side plane 10b. "n2" is an address value of the image pickup device, which corresponds to a basic position of document, and it is fixed value. (n2−n1) is the number of pixels which corresponds to a document height that is applied to a height detection proceeding. A distribution data of document height is obtained by use of the value of (n2−n1) at respective line. By using this distribution data of document height, a rectifying image distortion coefficient is calculated for rectifying image distortion caused by document height variation, and a data for control of auto focusing (AF), which drives the photographing lens 6 in longitudinal direction in order to get rid of defocus caused by the document height variation, is also calculated.

Figure 8:
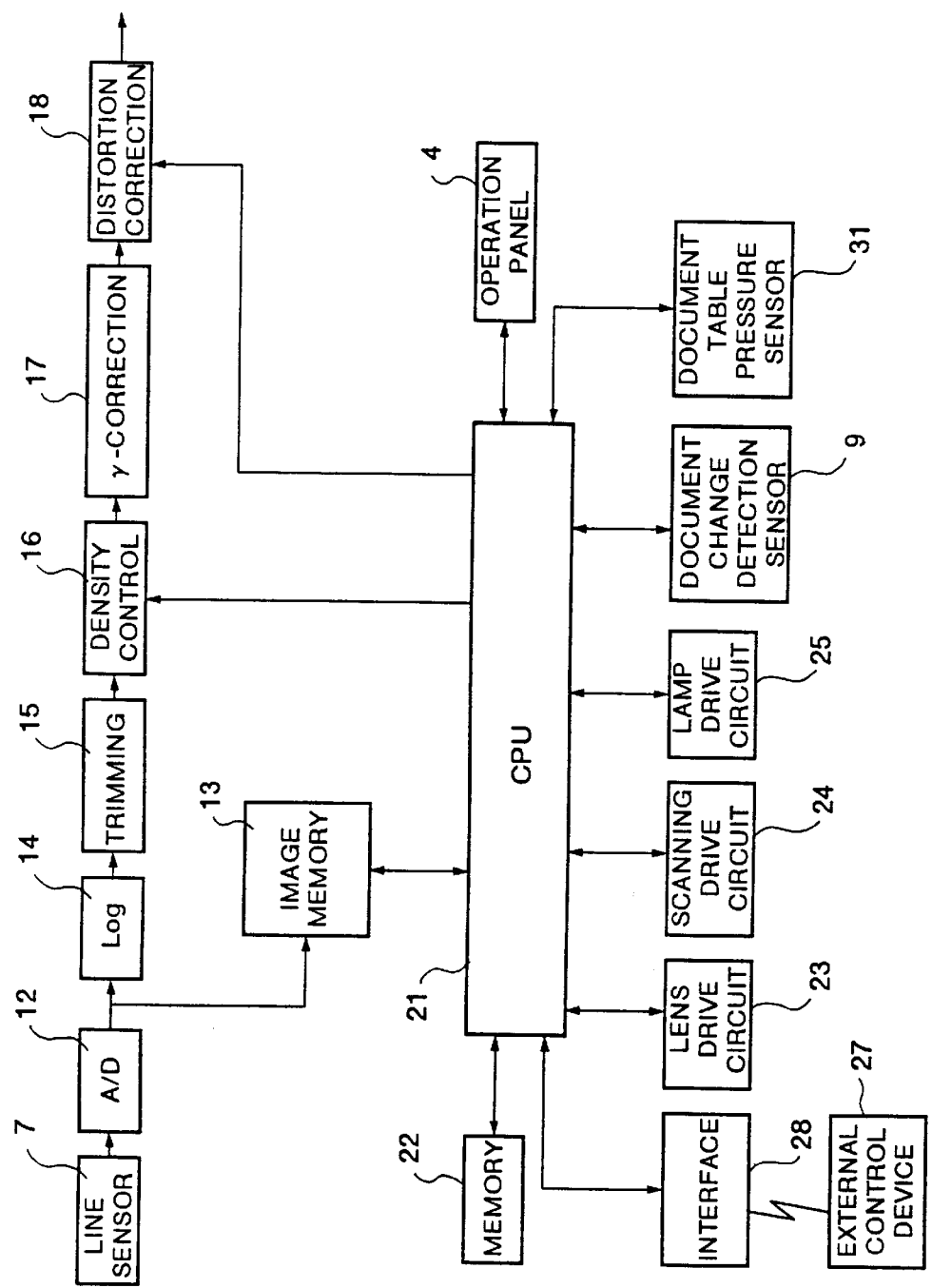
FIG. 8 is a block diagram of control circuit of the image reading apparatus.

FIG. 8 is a block view of a control circuit of the image reading apparatus. In the present embodiment, the line sensor 7 executes pre-scanning for sampling an image data in order to detect a document height and to control a density to be reproduced, which will be mentioned later, before a scanning operation of actual image reading (main-scanning). A reflected light gathered by the photographing lens 6 is imaged on the line sensor 7, converted to electric signals in accordance with the amount of received light by the image pickup devices of the line sensor 7, and then output to an A/D converter in order of arrangement of the image pickup devices. The electric signals input to the A/D converter 12 is converted digital image data, and output to an image memory 13 at pre-scanning and to a trimming circuit 15 through a Log conversion circuit 14 at main-scanning. The image memory 13 has a capacity that can memorize an inputted image data by a few lines, and it memorized a few lines of an image data obtained at the pre-scanning.

As an image data output from the A/D converter 12 shows a level which corresponds to the amount of received light at image pickup devices of the line sensor 7, that is a brightness level of a document surface, it is converted to a density level of an image by the Log conversion circuit 14. The conversion at the circuit is executed in the formula, $$D = Log\ 1/L\ (D: \text{density value}, L: \text{brightness value})$$

In the trimming circuit 15, as inputting image data contains also an image data of the upper side plane of a bookform document 10, it removes the image data of document upper side plane, and extracts only the image data of document surface 10a and outputs it to a density control circuit 16. The density control circuit adjusts an image density level by proceeding of density control, which will be explained later. The adjusted image data in its density is processed in γ-correction and distortion rectification at a γ-correction circuit 17 and a distortion correction circuit 18, and then it is output to an external device such as a printer and a personal computer. Here, the distortion rectification refers to rectification of distorted image caused by a curvature of the document surface 10a in a bookform document 10, and the γ-correction will be mentioned later.

A CPU 21 which is a microcomputer controls an operation of an image reading apparatus. The CPU 21 reads out an image data memorized in an image memory 13 by one line, and based on the image data, it detects a height of the document surface 10a at each reading position, and at the same time, it detects a brightness level of an image data, which corresponds to ground part of a document surface in each line, and then it inputs them into a memory 22. Also, the CPU 21 gives a height data or a density level data memorized in a memory 17 to the density control circuit 16, and controls an adjustment of density level of an image, which is executed in the color density control circuit 16. Further, the CPU 21 outputs a control signal to a lens drive circuit 23, and drives a lens in accordance with a reading position by the line sensor 7 in order to image an image of the document surface 10a on the line sensor 7 in-focus state at all times. Furthermore, the CPU 21 outputs a control signal to a scanning drive circuit 24 and a lamp drive circuit 25 for a control of scanning operation of the line sensor 7 and illuminating a lamp of the illumination unit 3.

Further, a document change detection sensor 9 and a document table pressure sensor 31 are connected to the CPU 21, also an interface 28 is connected for communication with an external control device 27. The CPU 21 receives various kinds of commands and information from the external control device 27 through the interface 28, and sends an operational state and the like to the external control device 27. As for the interface 28, one that is capable of communication in two ways is used, and it may be a serial communication method, what is called, RS422, besides a parallel communication and one that can be connected to LAN such as an inter network may be replaced.

Further, according to the apparatus, it adjusts a density level of read out image data in accordance with a density of an image part at a document surface 10a and a brightness level of the ground part of the same (auto density control). This proceeding of an images density control will be explained in following.

Figure 9:
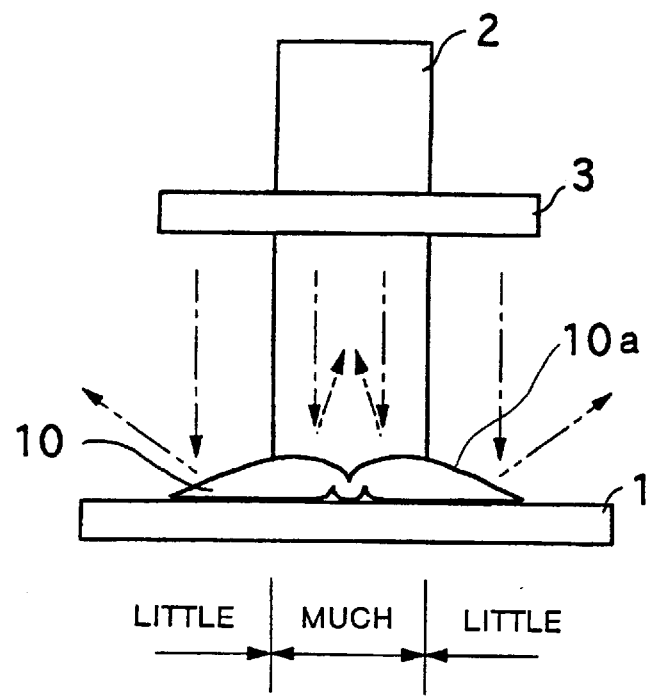
FIG. 9 is an explanatory view of a variation of the amount of light-receiving at line sensor, which is caused by curvature of bookform documents.

FIG. 9 is a view explaining a variation of the amount of received light at the line sensor 7 which is caused by a curvature of a bookform document 10. In a bookform document 10 set on a document table 1, its bound part has a sunken shape, and the central part of both pages has a rising shape in general. Then, if the document surface 10a has high glossiness as a mirror surface, the light from an illumination unit 3 illuminates to the document surface 10a, is reflected directly on the document surface 10a, and the light is reflected to central part of the image reading apparatus on the bound part, and the light is reflected outward of the apparatus on both side parts of the bookform document. Since the image reading unit 2 is disposed on the center and upward of the image reading apparatus, the amount of received light of the line sensor 7 is large at the bound part of the document and small at the both side parts. Such kind of phenomenon does not occur in a document with high-degree of diffusion of light wherein an incident light to a document is reflected to every direction uniformly, however, as a document such as books and files which has images on its paper has some glossiness, a difference occurs in the amount of received light because of its curved shape.

Figure 10:
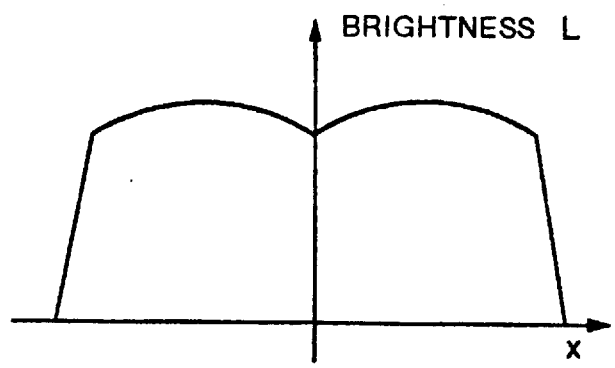
FIG. 10 is a view showing a distribution of document ground brightness in a sub-scanning direction for one page of a bookform documents

FIG. 10 shows a distribution of ground brightness in sub-scanning direction (x) by one page of a bookform document 10. Since the central part of the document has low height, it is far from the illumination unit 3 and the image reading unit 2, also, as its surface is inclined, the ground brightness is low value. Further, at both right and left side parts of the document, as the brightness tends to be decreased because of faded color in addition to said reason of low height in the central part, the ground brightness has low value in the same manner. For such ground brightness which varies in sub-scanning direction, a density is rectified by a few lines, and the ground brightness level is uniformed. By this proceeding, the uniformed image can be reproduced at all parts of the whole document.

Figure 11:
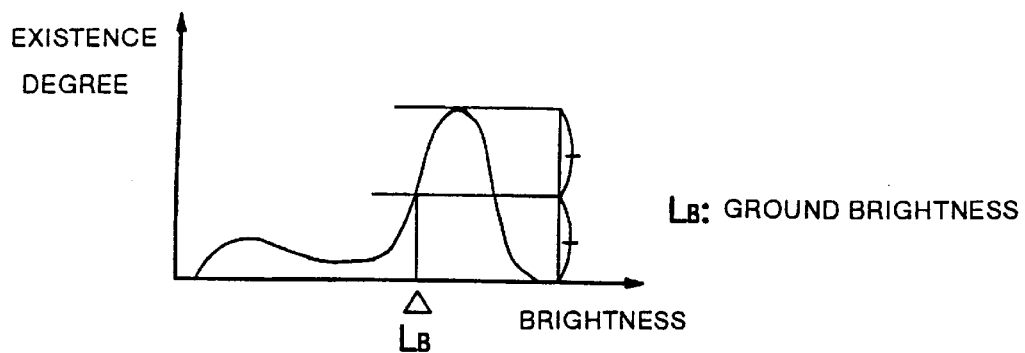
FIG. 11 is a histogram showing a distribution of brightness level of an image data for one line in a memorized image data in an memory.

FIG. 11 is a histogram showing a distribution of a brightness level of an image data by one line in an image data memorized in a memory 22. In the figure, a lateral axis shows a brightness level of an image data, and a vertical axis shows the number of pixels of each brightness level (existence degree). In a document with images of letters, the brightness distribution shows a normal distribution which has a peak in the brightness level corresponding to the letters part and in the brightness level corresponding to the ground part. Accordingly, based on the distribution, a brightness level of letter part (image part) and ground part in a document can be detected. In the present embodiment, the brightness of letters part has a half existence degree of the peak value in brightness distribution of the ground part, and a brightness level LB, which is lower than the peak brightness level, is detected, and the brightness level LB is defined as a brightness level of ground part. The proceedings of the above-mentioned brightness level detection is executed by the CPU 21 for image data at each reading position in sub-scanning direction. The CPU 21 converts a brightness level LB to a density level DB, and inputs it to the memory 22. Conversion from the brightness level to the density level is executed based on the conversion formula by use of the Log conversion circuit 14.

In this manner, when a density level of ground part DB at each reading position is memorized in the memory 22 at pre-scanning, the CPU 21 reads out the density from the memory 22 at main-scanning, and outputs them to a density control circuit 16 one by one. The density control circuit 16 executes adjustment of the density of an image data in accordance with these density levels.

Figure 12:
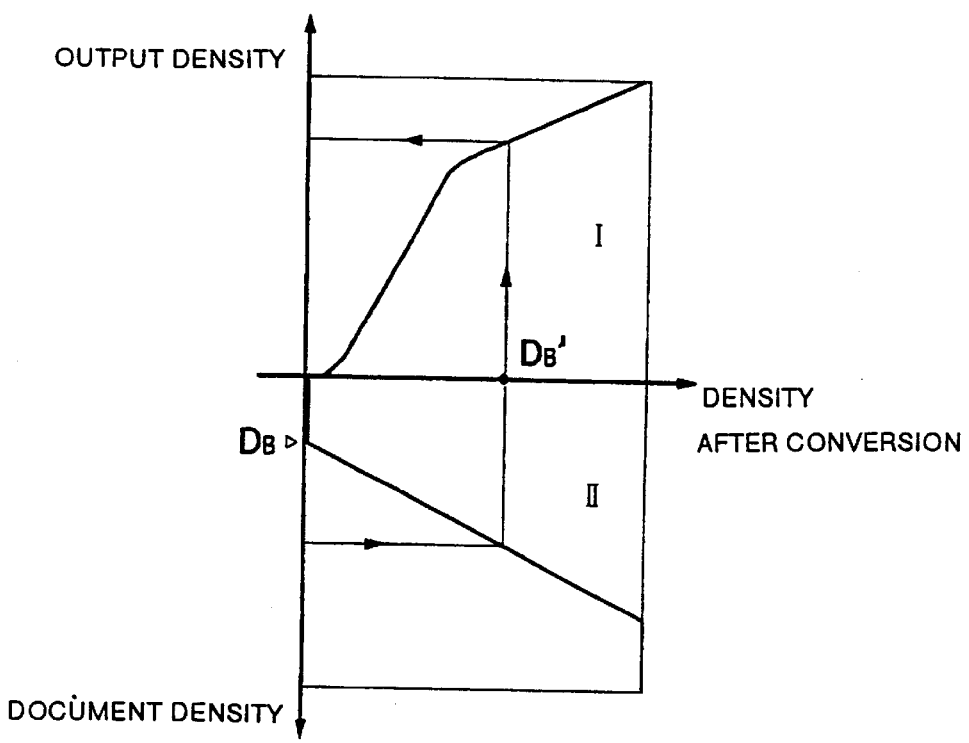
FIG. 12 is an explanatory view of density adjustment of an image data, which is executed by a density control circuit.

FIG. 12 is a view explaining a density adjustment of an image data executed by the density control circuit 16. In the figure, the second quadrant shows a linear function which is applied to the density adjustment executed by the density control circuit 16. A vertical axis in the second quadrant shows a density level of image data to be inputted to the density control circuit 16, and a lateral axis shows a density level of image data after density adjustment, i.e., a level of image data outputted from the density control circuit 16.

The density control circuit 16 sets up a linear function so that ground brightness level DB might be an intercept based on ground density level DB given by the CPU 21, and by this determined linear function, an image data input from a trimming circuit 15 is to be converted and it is outputted. Accordingly, as a result of this adjustment of density, a ground part of a document surface 10a is output as an image data of white (density 0), and a letter part of the same is output as an image data of black. Thus, for example, even though a document has a gray-colored ground on its document surface such as newspapers, the image data of its ground part is converted to white level, and it is reproduced in ground color of print paper. Further, since above-mentioned density adjustment of image is executed at each reading position in sub-scanning direction, ground color of a document surface 10a is standardized into white level at each reading position, therefore, it is able to rectify a variation of brightness caused by curvature of a document surface of a bookform document 10 as shown FIG. 10.

In FIG. 12, the first quadrant shows a manner of conversing density of image data, which is applied for γ-correction executed by a γ-correction circuit 17. A lateral axis in the first quadrant shows a density level of an image data to be inputted to the γ-correction circuit 17, that is a density level of image data which is outputted from the density control circuit 16. A vertical axis shows a density level after γ-correction, that is, a density level outputted from the γ-correction circuit 17. In the γ-correction, non-linear conversion is executed according to the characteristics of output terminal such as printers. In the present embodiment, an incline of conversion function at an area with low density is raised up to improve the reproduction of faint letters, and an incline of outputted density at an area with intermediate density is made gently to improve the reproduction of pictures.

Figure 13:
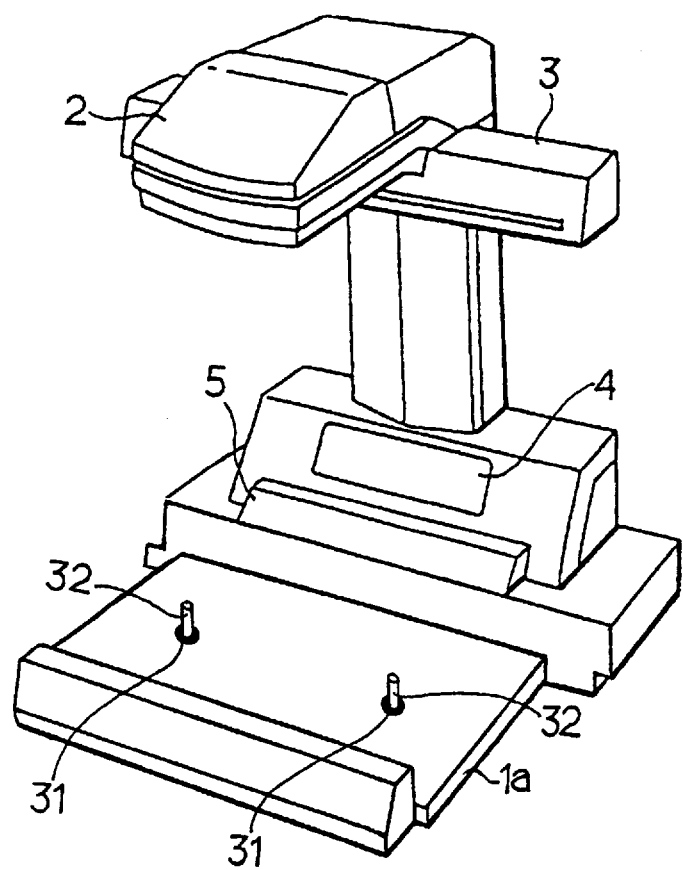
FIG. 13 is a perspective view showing a state that a document table is removed from the image reading apparatus.

FIG. 13 shows a state that a document table 1 shown in FIG. 1 is removed from the image reading apparatus. In this figure, a prop 32 supporting the document table 1 is disposed on a base 1a, and a document table pressure sensor 31 for detecting pressure of the base 1a from the prop 32 is disposed at a basement of the prop 32. A document table 1 which is put on the prop 32 is composed of a right and left plates, and pressure of the respective plate can be detected by the document table pressure 31. When a document on the plates has much pages, it weights a lot, and then a pressure received at the base 1a becomes great. Accordingly, the amount of pages can be obtained substantially from the pressure to the base 1a by each right and left plate. The CPU 21 checks the sensor 31 and detects the amount of variation of the amount of document pages on respective left and right pages when a previous image reading is over and a following image reading is started.

FIG. 14(a), FIG. 14(b), and FIG. 14(c) are flowcharts showing processes of the CPU 21 on image reading by the image reading apparatus constructed as above. When a power source of the image reading apparatus is ON (#1), the image reading apparatus is initialized (#2), and a flag "no previous data of ground brightness" is set (#3). If a data of ground brightness has been memorized in a memory 22 in the image reading apparatus, said flag is set for "1", and if a data of ground brightness has not been memorized in the memory 22, it is set for "0". Next, A flag "no previous data of height" is set (#4). This height data is applied in order to rectify an image distortion which is caused by the height of a bookform document. Then, it waits until a start key 8 is ON (#5), and when it is ON, a lamp of an illumination unit 3, which illuminates a document for starting reading operation, is ON (#6).

Next, a flag is checked whether data of ground brightness of previous image reading is memorized in a memory 22 or not (#7), and if it is memorized in the memory 22, i.e., is the flag is "1" (#7, YES), then, a flag is checked whether a data of height is memorized in the memory 22 or not (#8), and if it is memorized in the memory 22, i.e., is the flag is "1" (#8 YES), then, an output of document change detection sensor 9 is checked whether a document is changed or not (#9). Then, if a document is not changed (#9, NO), the amount of variation of document pages is judged by an output of the document table pressure sensor 31 (#10). If the amount of variation is not beyond a predetermined value (#10, NO), main-scanning is executed by using the ground brightness data at previous image reading as a data for rectifying density (#12). If there is no previous data of ground brightness, i.e., a flag is "0" (#7, NO), and there is no previous height data, i.e., a flag is "0" (#8, NO), and if a document of a document table 1 is changed (#9, YES), and if a document page is turned over more than predetermined value (#10, YES), then pre-scanning is executed (#11), thereafter, main-scanning is executed (#12). When the main-scanning is completed, a lamp of the illumination unit 3 is OFF (#13).

An operation of a pre-scanning (#11) will be now explained. In a sub-scanning, at every reading out one line (#111), a histogram is made (#112). A ground brightness of the line LBn is calculated by use of the histogram (#113). Further, a data of height for rectifying image distortion caused by document height is detected by counting the number of pixels which corresponds to an image on the document upper side plane 10b at every reading out of one line (#114). The above-mentioned proceedings are executed all over lines where a pre-scanning is executed (#115). After a sampling is completed all over the lines, a data in the memory 22 is renewed by applying the detected data as a data for rectifying density (#116), and "ground data exist" is set up (#117). Then, a data in the memory 22 is to renewed by applying the detected height data as a data for rectifying image distortion (#118), and "height data exist" is set up (#119).

At a main-scanning (#12), after reading out one line (#121), a density is rectified (#122) and an image distortion is rectified (#123) based on the ground brightness distribution data and height data which are memorized in the memory 22. These rectifying processes are executed all over lines (#124).

In the above-mentioned embodiment, although whether the number of pages is varied a lot or not is judged by checking the document table pressure sensor 31, other judgment manner can be applied: the variation of pages is to be recognized by counting how many pages of a document are turned over from right to left or from left to right, and a height distribution data is renewed when predetermined amount of pages is turned over. This method will be explained referring to the FIGS. 15, 16, 17, and 18. FIG. 15 shows a front view of the image reading apparatus. Page count sensors 50 and 51 which detect how many pages are turned over (hereinafter refer to page count sensor) are arranged so that they are opposed to both right and left pages of a bookform document set on the document table 1 in the image reading unit 2. These page count sensors 50 and 51 are ones that detect a distance to a document surface 10a of a bookform document 10 from the sensors.

Figure 16:
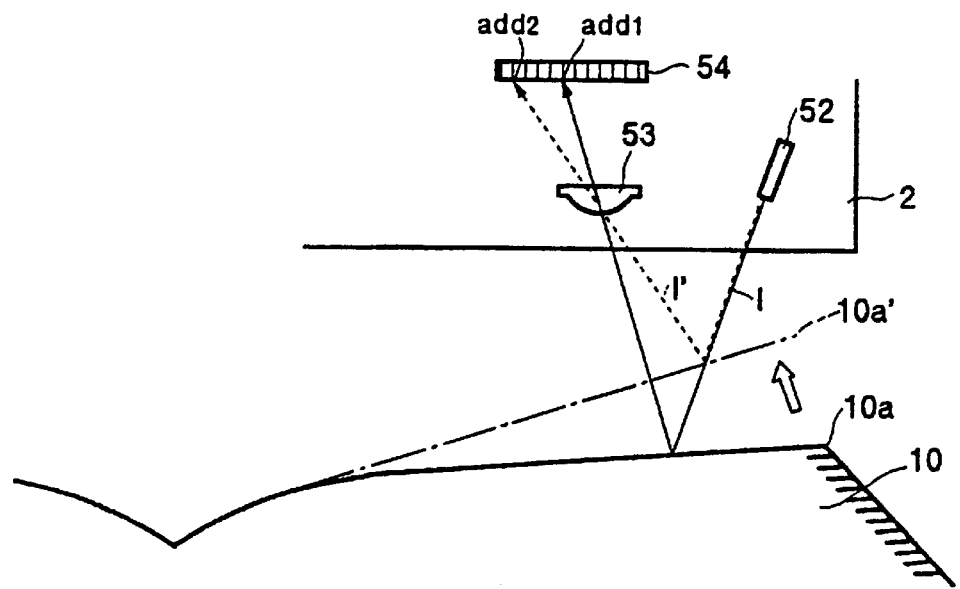
FIG. 16 is an explanatory view of detecting method of turned over pages.

Now, a method for detection of turned over pages will be explained referring to FIG. 16. FIG. 16 shows a manner of distance measurement of right pages. The construction of a page count sensor 50 is shown magnified, and a distance between a document surface 10a and an image reading unit 2 is short cut for easy to understand the detection principle. Regarding an explanation of distance detection of left pages is omitted because it is executed in the same manner as right pages symmetrically. The page count sensor 50 is composed of a light emitting element 52, a lens 53, and a line sensor 54 (same in the sensor 51). An optical path of the light emitting elements 52, which radiates on a document surface 10a with no risen page, is defined as "1" shown in a solid line. Also, a document surface 10a' with a risen page on being turned over is shown in a chain line, and an optical path of the light emitting elements 52, which radiates on the risen document surface 10a', is defined as "1'" shown in a dotted line.

A light from the light emitting element 52, which is reflected on a document surface 10a with not risen page, is incident to add1 of the line sensor 54. A light which is reflected on a document surface 10a' with a risen page, is incident to add2 of the line sensor 54. In this manner, if a distance between a document surface and the page count sensor 50 is longer, a light of the light emitting element 52 is incident to the right of the line sensor 54, and if it is shorter, it is incident to the left of the same (left and right is replaced in case of the sensor 51). Accordingly, the distance between a document surface and the page count sensor 50 is detected by a position of incident light to the line sensor 54.

Figure 17:
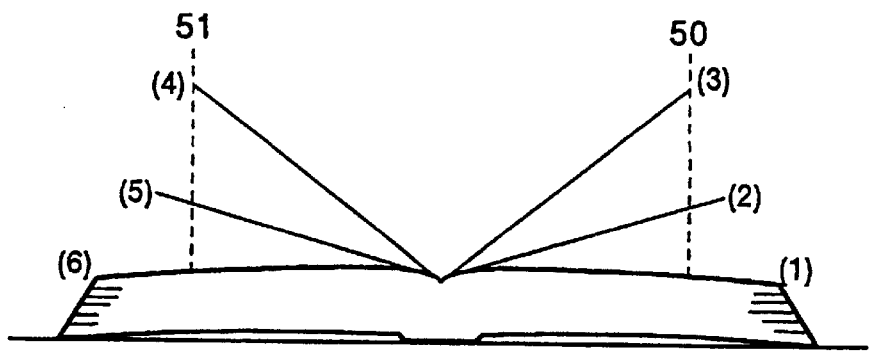
FIG. 17 is a view showing a state that a page of a bookform document is being turning over.

FIG. 17 shows a manner that a page of a bookform document 10 is turning over. When it is turned from right to left, the steps are; (1)–(2)–(3)–(4)–(5)–(6). When it is turned from left to right, the steps are: (6)–(5)–(4)–(3)–(2)–(1).

Figure 18A:
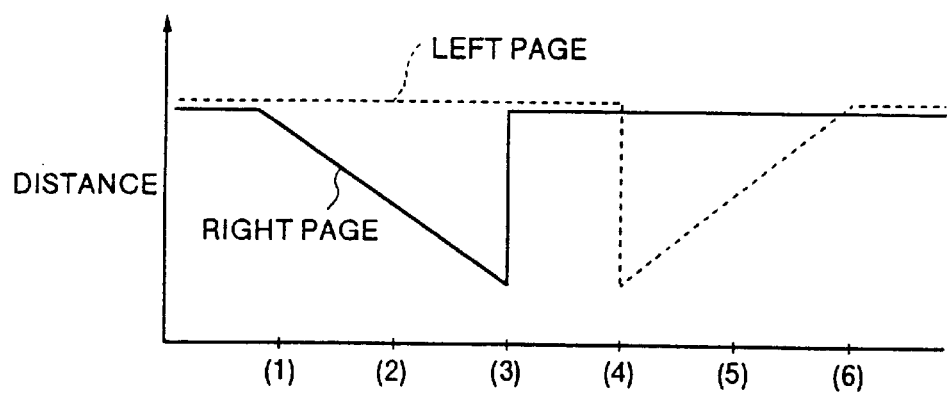
FIG. 18(a) is a view showing an output of a page turned detection sensor of turned pages when a page of bookform document is turned over from right to left.

FIG. 18(a) shows an output of the page count sensors 50 and 51 when a page of a bookform document 10 is turned over from right to left. An output of the page count sensor 50 for right pages is shown in a solid line, and an output of the page count sensor 51 for left pages is shown in a dotted line. In this output, a position of incident light to the line sensor 54 is changed to a distance between a document surface and the sensor. As a document surface 10a is turned over and changed its state from (1) to (2), a distance between the document surface and the sensor 50 becomes short, then an output of page count sensor 50 for right pages is decreased gradually. At a state of (3), the output value is increased radically (a distance becomes longer between document surface and the sensor 50) since although the distance has been detecting by letting light of the light emitting elements 52 reflect on the page being turned, the reflecting light comes to be out of the page being turned and a reflection plane is switched to the next page beneath. During a state of (3) to (4), there is no variation in output of both page count sensors 50 and 51. When the page being turned comes a state of (4), the output value of page count sensor 51 for left pages is decreased radically since although the page count sensor 51 has been detecting the distance by letting light of the light emitting elements 52 reflect on the page beneath, the reflection plane is switched to the page being turned. Then, as the state of page being turned is changed from (4) to (5), a distance between the document surface and the sensor 51 for left pages is longer, and an output value of the page count sensor for left pages is increased. When the page is turned over completely, and the state comes to (6), a variation in output of both the page count sensors 50 and 51 is diminished.

Figure 18B:
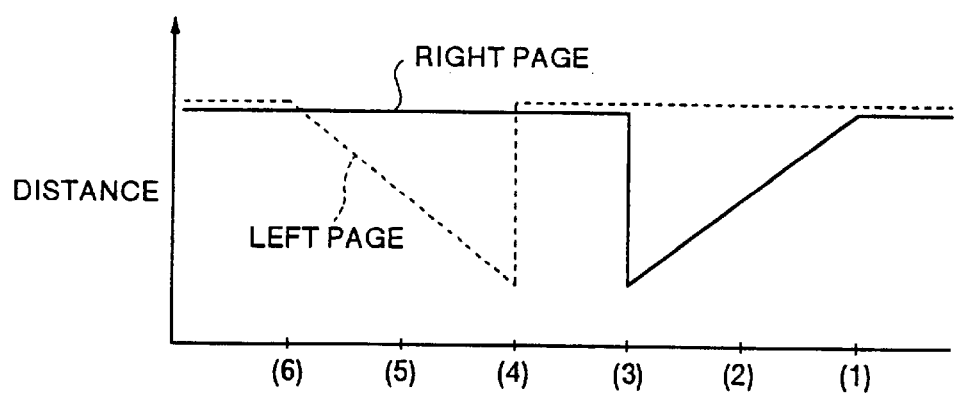
FIG. 18(b) is a view showing an output of the page turned detection sensor of turned pages when a page of bookform document is turned over from left to right.

FIG. 18(b) shows an output of the page count sensors 50 and 51 when a page of a bookform document 10 is turned over from left to right. An output of the page count sensor 50 for right pages is shown in a solid line, and an output of the page count sensor 51 for left pages is shown in a dotted line. In this output, a position of incident light to the line sensor 54 is changed to a distance between a document surface and the sensor. As a document surface 10a is turned over and changed its state from (6) to (5), a distance between the document surface and the sensor 50 becomes short, and an output of the page count sensor 51 for left pages is decreased radically. At a state of (4), the output value is increased radically (the distance becomes longer between document surface and the sensor 50) since although the distance has been detecting by letting light of the light emitting elements 52 reflect on the page being turned, the reflecting light comes to be out of the page being turned and a reflection plane is switched to the next page beneath. During a state of (4) to (3), there is no variation in output of both page count sensors 50 and 51. When the page being turned comes a state of (3), the output value of the page count sensor 50 for right pages is decreased radically since although the sensor 50 has been detecting the distance by letting light of the light emitting elements 52 reflect on the page beneath, the reflection plane is switched to the page being turned. Then, as the state of page being turned is changed from (3) to (2), a distance between the document surface and the sensor 50 is longer, and an output value of the page count sensor for right pages is increased. When the page is turned over completely, and the state comes to (1), a variation in output of both the page count sensors 50 and 51 is diminished. In counting of the number of pages which are turned over, when an output variation of the sensors 50 and 51 is occurred in order of the sensor 50 and 51, it counts "+1", and if the variation is occurred in order of the sensor 51 and 50, it counts "−1", that is, when a page is turned from right to left, it counts "+1", and when a page is turned from left to right, it counts "−1". The amount of variation of whole pages is an absolute value of sum total value of these counting values.

The amount of variation of total pages which obtained in this manner can be replaced to the amount of pages which is detected in the method by use of document table pressure sensor 31 (FIG. 14, #9, #10) as before-mentioned. Further, by using both these method, when a plural pages are turned over at a time, the large amount of variation can be detected by the method of the document table pressure sensor 31, and when pages are turned one by one and an output of the pressure sensor 31 is varies only little by little, the amount of variation can be detected by the variation of turned pages which is detected by the page count sensors 50 and 51.

Now, the second embodiment according to the present invention will be explained referring to the drawings.

Figure 19:
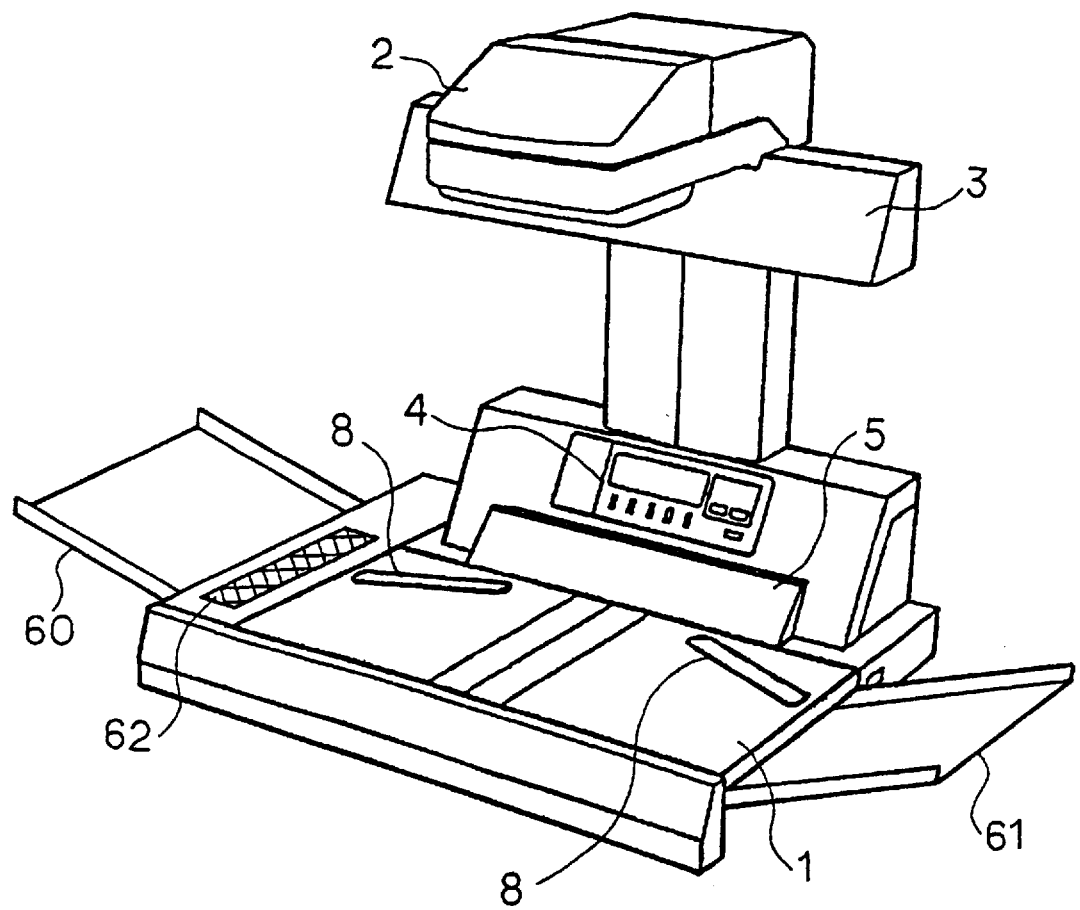
FIG. 19 is a view showing an overall construction of an image reading apparatus according to the second embodiment of the present invention.

FIG. 19 shows an overall construction of the image reading apparatus according to the second embodiment. In the figure, a bookform document or a sheetform document or the like is placed face-up on a document table 1, and an image reading unit 2 for reading out the document optically is arranged above the document table 1. When a bookform document is placed on the document table 1, the document image is read out with auto-focusing by an optical scanning of sensor (CCD line sensor) in the image reading unit 2 in accordance with a result of distance measurement by a distance measuring means in the image reading unit 2. When a sheetform document is placed on the document table 1, the document image is read out with a predetermined fixed focal length <1> by an optical scanning of the sensor in the image reading unit 2 as mentioned later. An illumination unit 3 for illuminating a document is arranged rearward above the document table 1, an operation panel 4 for setting up conditions for image reading and other conditions is arranged, and a distance measuring mirror 5 for imaging an upper side plane's shape of the document is arranged rearward the document table 1. An auto document feeding unit 60 having a document feeding tray for feeding a sheetform document continuously and automatically (hereinafter refer to ADF unit 60) is arranged left side of the document table 1, and a printout tray 61 for receiving the sheetform document sent out is arranged right side of the document table 1. Further, a document image reading section 62 having an aperture with a transparent window, is disposed outside area on which a document is to be placed, and it reads out a sheetform document, which is send out from the ADF unit 60 and goes through the document image reading section 62, with a fixed focal length <2> as mentioned later. At this time, the sensor is fixed, and a document image is read out by the document movement. An image reading operation is started with pushing a start key 8 disposed on the document table 1.

Figure 20:
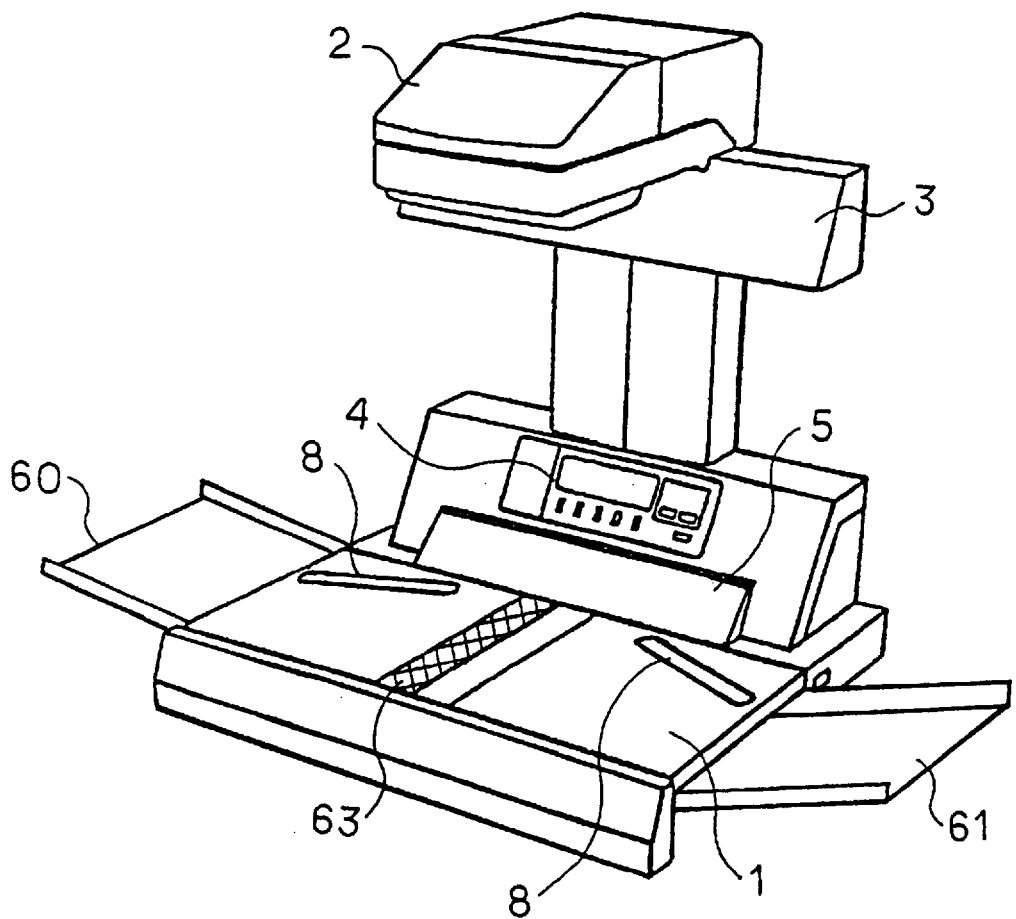
FIG. 20 is a view showing a mini-sized image reading apparatus according to a modified second embodiment.

FIG. 20 is an overall construction of the image reading apparatus which is designed more smaller than one shown in FIG. 19 according to the second embodiment. In the figure, a difference to the construction in FIG. 19 is that a document image reading section 63 for image reading of a sheetform document with a fixed focal length is arranged approximately in the middle of the document table 1. In this construction, it reads out a sheetform document, which is sent out from the ADF unit 60, removing off a document on the document table 1. The document image reading sections 62 and 63 may be constructed by being covered with a transparent plate or by providing a metal plate which can open and shut as a shutter construction when it is necessary.

Figure 21:
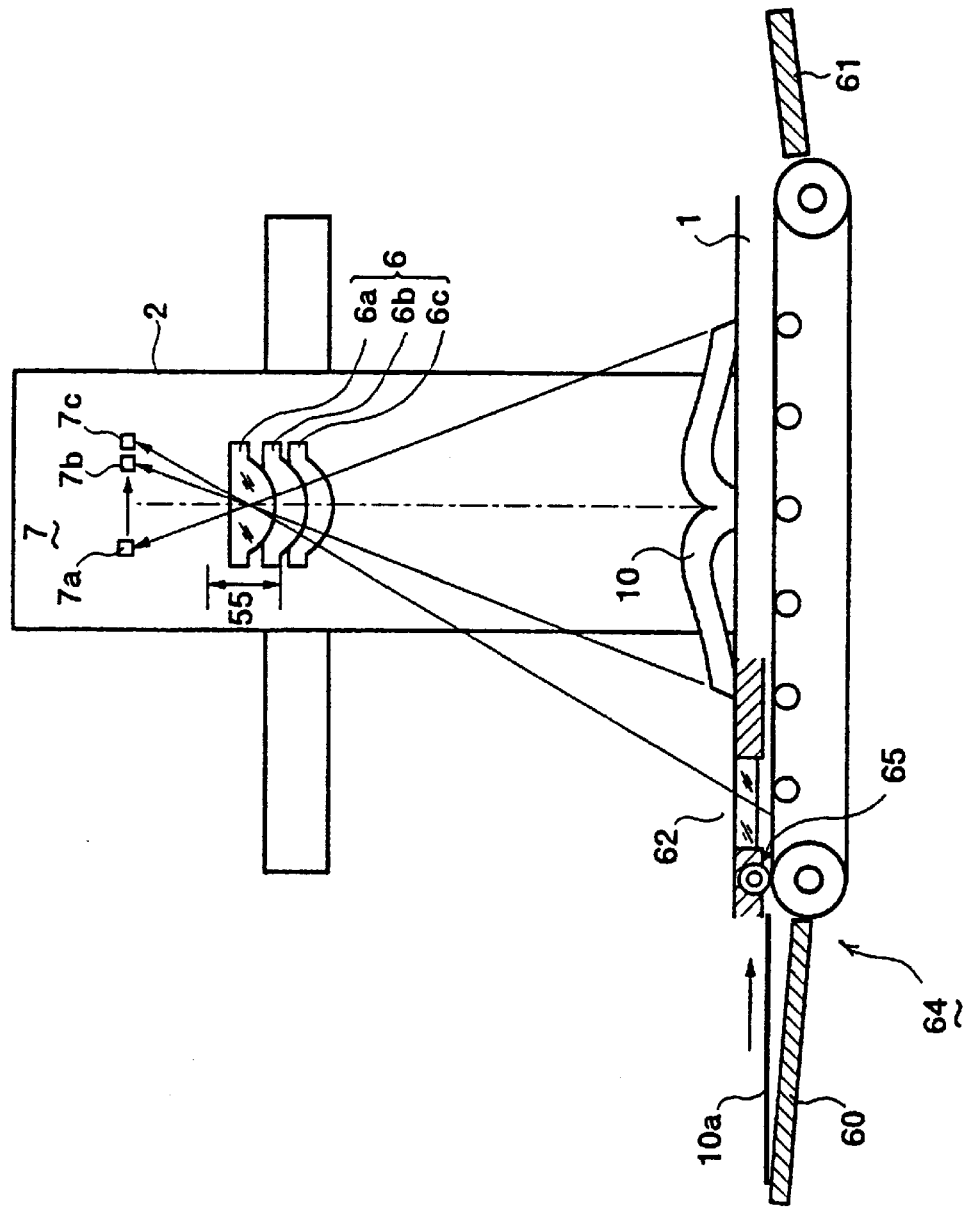
FIG. 21 is a front view showing a schematic construction of the image reading apparatus according to the second embodiment.

FIG. 21 is a front view showing a schematic construction of the image reading apparatus shown in FIG. 19. The image reading unit 2 is an optical system for imaging a document image on an image pickup device, comprising; a photographing lens 6 which is driven vertically by a motor for auto-focusing, and a line sensor 7, which is an image pickup device that picks up a document image on a focal plane where a document image is imaged. When a bookform document on the document table 1 is read out, the line sensor 7 is driven to scan in sub-scanning direction (7a→7b direction), and the photographing lens 6 is driven within a scope 55 shown in the figure corresponding to the scanning, and auto-focusing is executed. When a sheetform document (not shown) on the document table 1 is read out, the line sensor 7 is driven to scan in sub-scanning direction (7a→7b direction) same as above, however, the photographing lens 6 is fixed to a position 6b (fixed focal length <2>). Furthermore, when a sheetform document sent out from the ADF unit 60 is read out, the line sensor 7 is driven to a position 7c, and it reads out a document image by the document movement. At the time, the photographing lens 6 is fixed to the position 6a (fixed focal length <1>).

A document 10 placed on the document table 1 is, for example, books and files, which are bound in its' side edge potion, and those of each right and left page becomes a cylindrical shape curved spacially when they are opened. A plural sheetform document 10a set on the ADF unit 60 is conveyed by a document feeding and conveyance unit 64 (shown its schematic construction here, and shown in detail in FIG. 32) from its top sheet in order, and it is read out by the line sensor 7 at the document image reading section 62, and sent to the printout tray 61. In this manner, even though documents are placed both on the document table 1 and the ADF unit 60, it is able to copy a desired document. Further, a document size detection sensor 65 is for detecting a size of a sheetform document to be conveyed, and it is arranged on a feeding path adjacent to the document image reading section 62.

Figure 22:
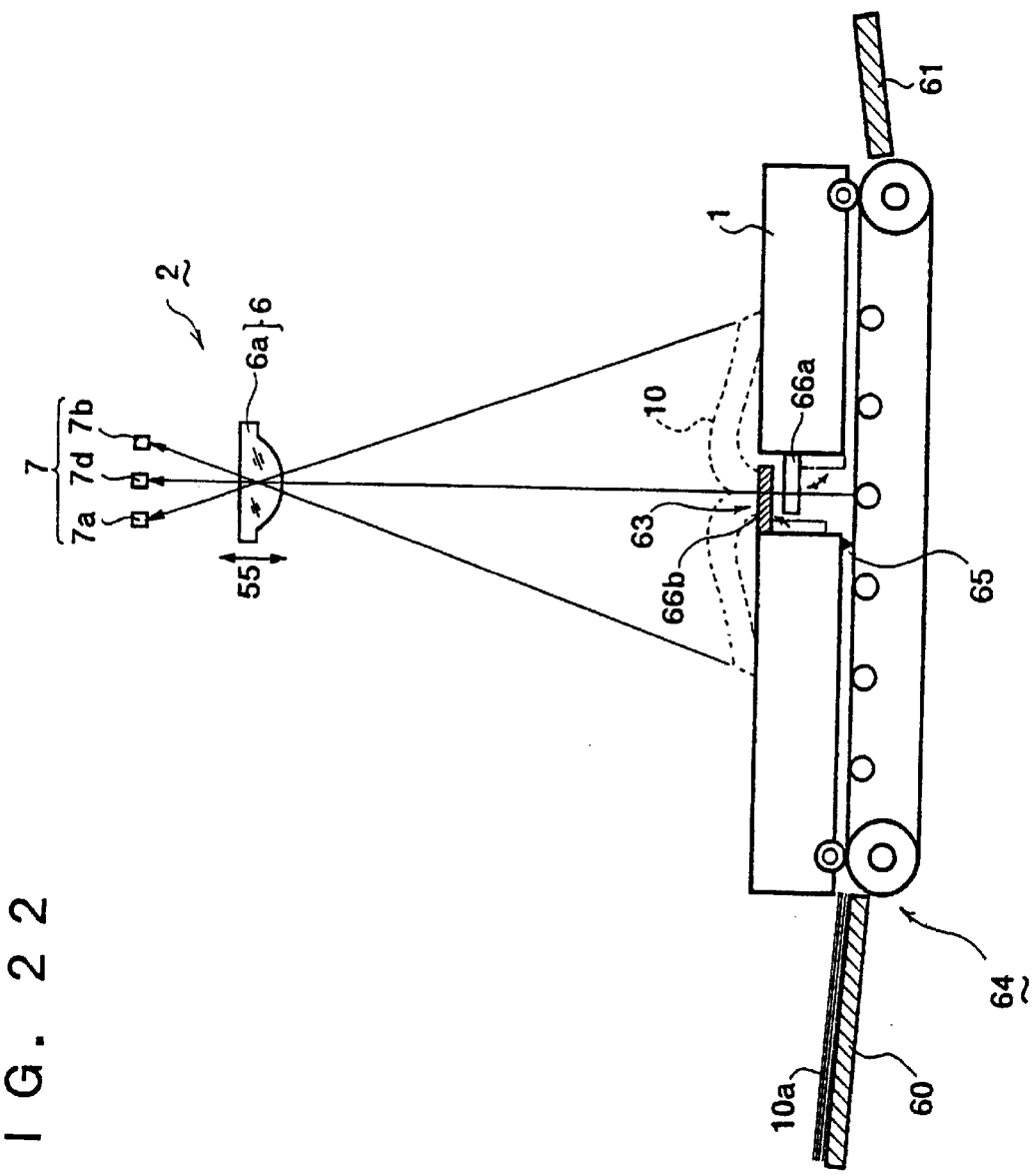
FIG. 22 is a front view showing a schematic construction of the mini-sized image reading apparatus according to the modified second embodiment.

FIG. 22 is a front view showing a schematic front construction of the image reading apparatus shown in FIG. 20. The image reading unit 2 has the same construction shown in FIG. 21. When a bookform document 10 placed on the document table 1 is read out, the line sensor 7 is driven to scan in sub-scanning direction (7a→7b direction), and, the photographing lens 6 is driven within a scope 55 in the figure for auto-focusing corresponding to the scanning of the line sensor 7 same as above. When a sheetform document (not shown) placed on the document table 1 is read out, the line sensor 7 is driven to scan in sub-scanning direction (7a→7b direction) same as above, however, the photographing lens 6 is fixed to a position 6a (fixed focus length <1>). Furthermore, when a sheetform document 10a sent out from the ADF unit 60 is read out, the line sensor 7 is driven to a position 7d, and it reads out a document image by the document movement. At the time, the photographing lens 6 is fixed to a position 6a (fixed focus length <1>). A document 10a set on the ADF unit 60 is conveyed by the document conveyance unit 64, and it is read out by the line sensor 7 through a transparent plate of the document image reading section 63, and then conveyed to the printout tray 61. Here, when a sheetform document sent out from the ADF unit 60 is read out, a document, which is placed on the document table 1 covering the document image reading section 63, needs to be removed. Further, at the document image reading section 63, a document hold plate 66b and a white plate 66a, which is used at an initial correction mode for illuminating light as described later, is arranged. When a document on the document table 1 is read out, the document hold plate 66b is in protruded state, and the white plate 66a is in pulling in state. When a sheetform document sent out from the ADF unit 60 is read out, the document hold plate 66b is pulled in and the white plate 66a is protrude, and after image reading for a correction data, the white plate 66a is pulled in.

Figure 23:
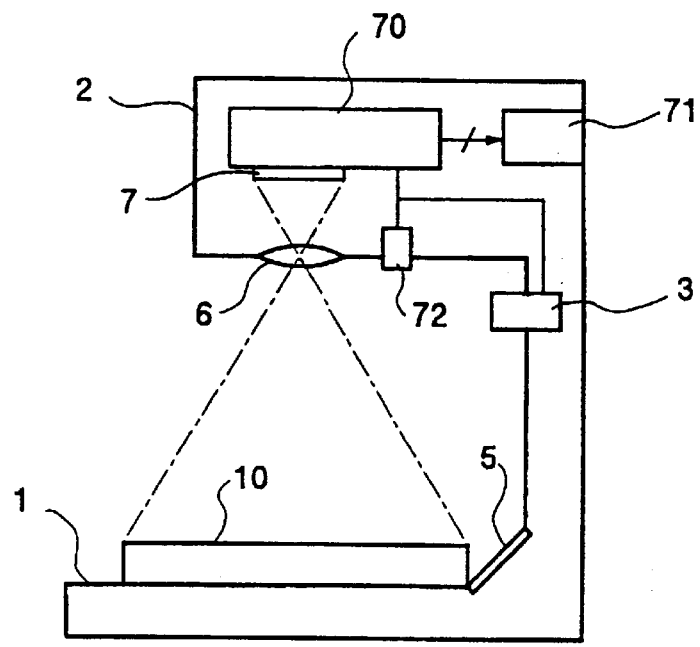
FIG. 23 is a side view showing a schematic construction of the image reading apparatus according to the second embodiment.

FIG. 23 is a side view showing a schematic construction of the apparatus according to the second embodiment as shown in FIG. 19 and 20. A part of the line sensor 7 reads out an image of a document upper side plane's shape imaged on the distance measuring mirror 5. The distance measuring mirror 5 is extended in right and left direction rearward in the document table 1, and it has also a function of stopping a document for setting the document position, and it is disposed at aslant of 45° to a surface of the document table 1. For positioning of the document 10, the upper side plane of the document is set as to fit along lower edge of the distance measuring mirror 5. Further, the apparatus includes an image signal processing unit which controls an image reading operation by the line sensor 7 and processes image signal read out, and a control unit 70 having an operation panel control unit, an interface unit 71 which outputs an image data inputted from the control unit 70 to the exterior, and a distance measuring unit 72 having a plural distance measuring sensor.

Figure 24:
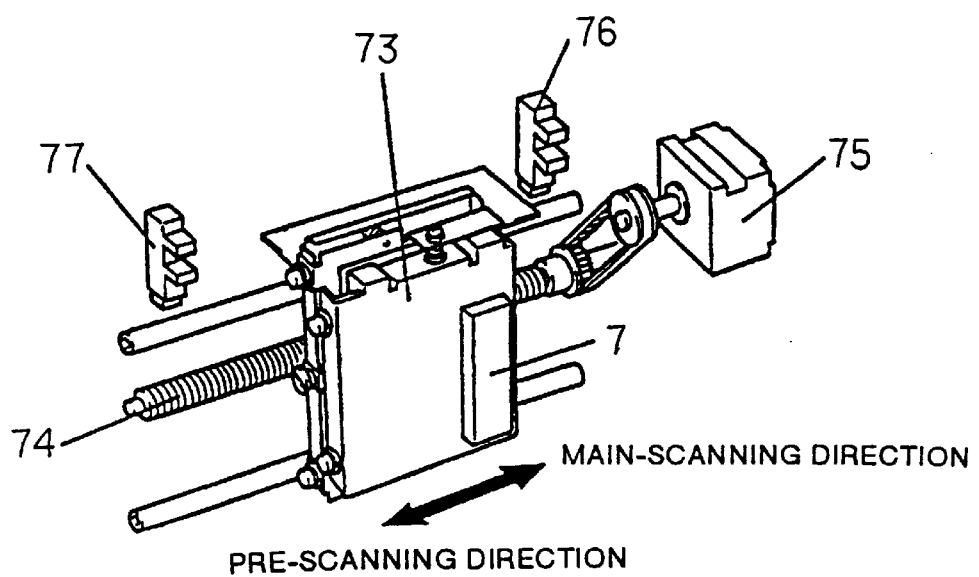
FIG. 24 is a structural view of an reading unit of the image reading apparatus according to the second embodiment.

FIG. 24 is a view showing a construction of an image reading unit 2. The imaging reading unit 2 contains a scanner 73 with the line sensor 7, and the scanner 73 reads out an image by being driven with a scanner motor 75 through a belt and conveyance gear shaft 74. A scanning speed varies in accordance with a document height and a copy magnification. A length of scanning varies in accordance with a document size. A scanner home sensor 76 is for checking a home position of the scanner 73, and a scanner limit sensor 77 is for checking an over running of the scanner 73.

An image reading operation is executed by scanning a document surface with the line sensor 7 arranged on a scanner, and by sending a document through with the line sensor fixed, however, if it needs that a document condition is detected for image reading before a scanning for image reading (main-scanning), a pre-scanning is executed. In the pre-scanning, it detects a document size, a document ground brightness, and a document height, and in the main-scanning, the document size is used as a data for setting an image reading scope, and the document ground brightness is used as a data for auto-exposure, and the document height is used as a data for auto-focusing and rectifying a distortion.

Figure 25:
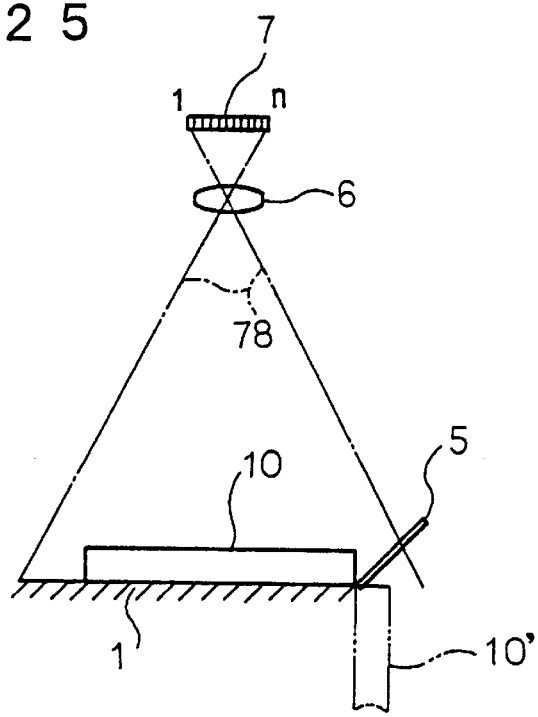
FIG. 25 is a principle view of document size and height detection.

Now, a detection method of a document size and a document height will be explained. FIG. 25 is a view showing a detection principle of a document size and height. When a document 10 is placed on a predetermined position, a mirror image 10' of the document 10 is formed by a distance measuring mirror 5, and a mirror image of the document upper side plane is formed on the extended line of an image of the document table 1 successively. A reading scope of the line sensor 7 is shown in a chain line 78, and the number of pixels of the line sensor 7 is shown in 1~n.

Figure 26:
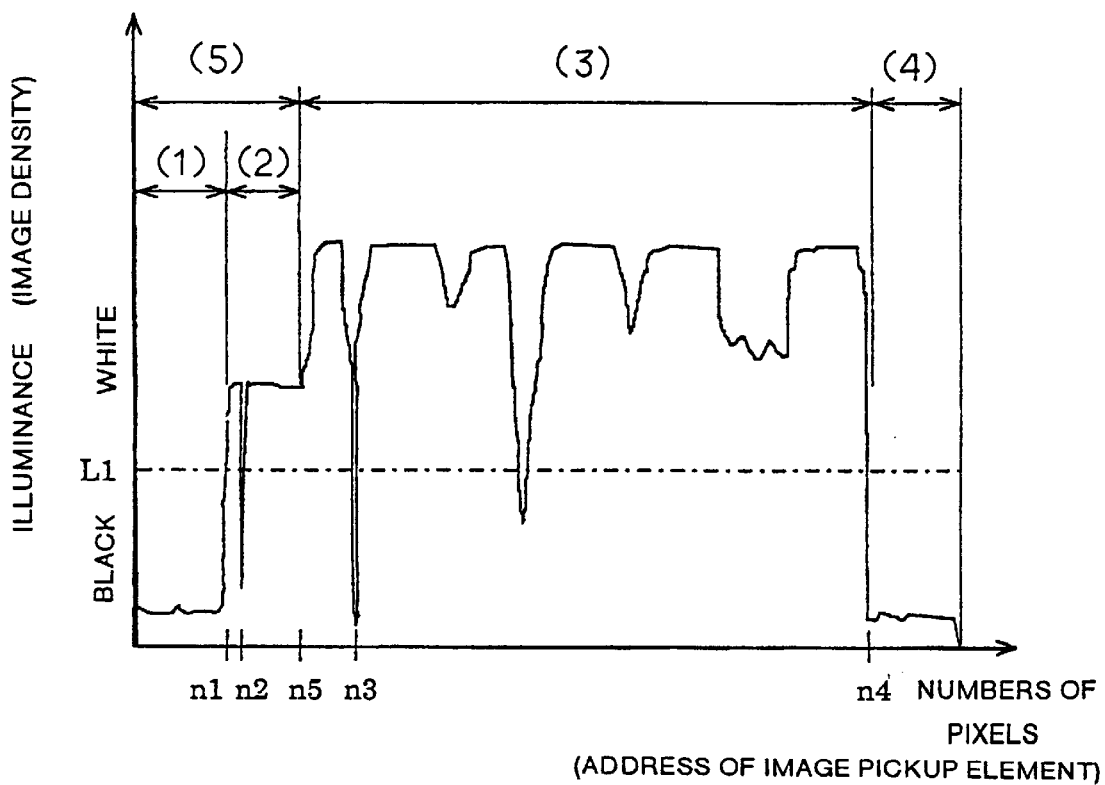
FIG. 26 is a view showing an example of output of one line in main-scanning direction read by a line sensor.

FIG. 26 shows a exemplified output of one line in a main-scanning direction which is read out by the line sensor 7. A lateral axis shows the number of pixels (address of image pickup element) of the line sensor (left=rearward, right=front-ward), and a vertical axis shows an illuminance of the sensor surface (image density). (1) is a background section imaged on a distance measuring mirror, (2) shows a document upper side plane section imaged on the same, (3) shows a document surface section, (4) shows a document table section, and (5) shows a distance measuring plate section. L1 is an illuminance threshold value, n1 is a minimum value of a pixel that output of the sensor shifts from black side to white side across the threshold value L1, n2 is a maximum value of a pixel that the output of the sensor shifts from white side to black side across the threshold value L1 under the number n5, n3 is a minimum and n4 is a maximum value of the pixel that the output of the sensor crosses beyond the threshold value L1 over the number n5, and n5 is a pixel (fixed) corresponding to the home position. "n1–n5" is the number of pixels corresponding to a height of a upper edge of a document side (document surface), and "n2–n5" is the number of pixels corresponding to a height of a lower edge of a document side (document reverse side). Then, a document size and a height distribution can be detected by obtaining these numbers of pixels of a document in sub-scanning direction and by converting them to a length.

Figure 27:
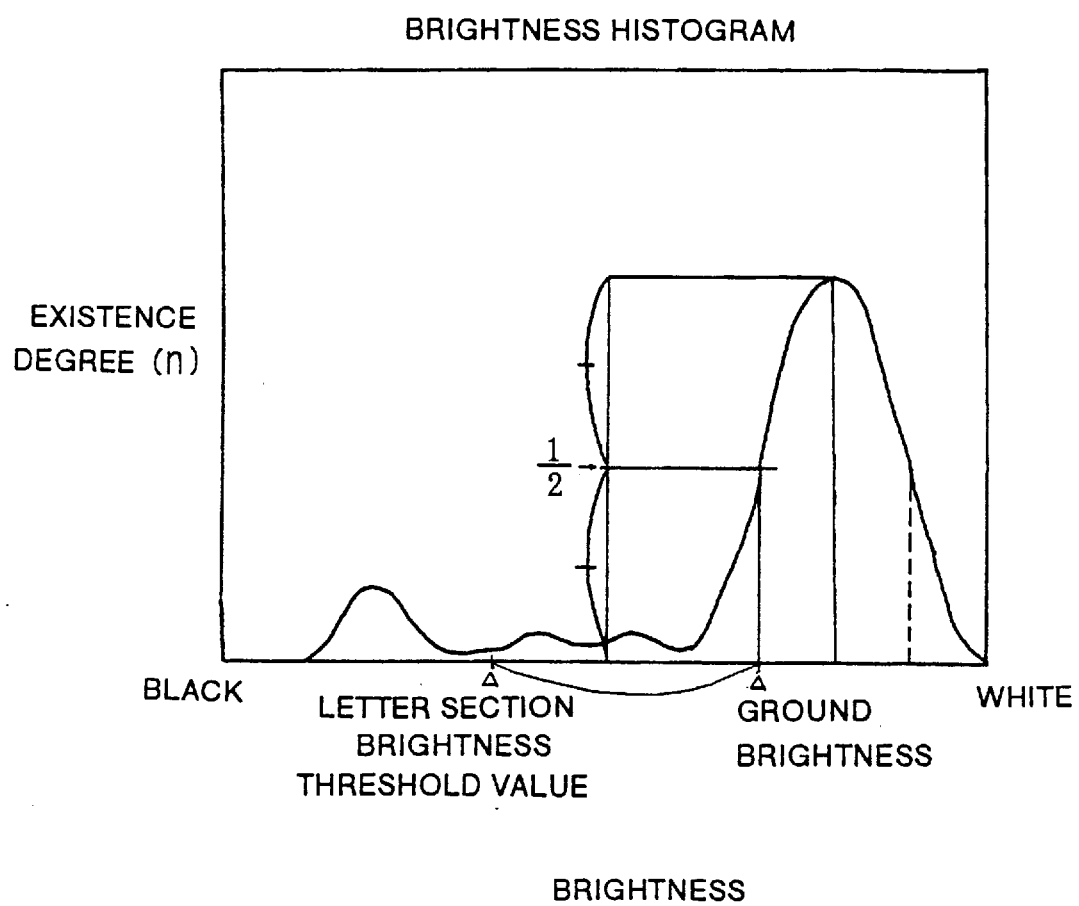
FIG. 27 is a document brightness histogram based on an output from the line sensor.

Now, a method of a document ground brightness detection will be explained. FIG. 27 shows a brightness histogram, which is made by an image data of one line of a document read out by the line sensor. In the histogram, it detects the number of peaks in high brightness part, and a lower brightness value having a half numbers of the obtained numbers is adopted as a document ground brightness of the line. A value, which is withdrew in a certain value from the ground brightness, is adopted as a threshold value of brightness in letters section.

Figure 28:
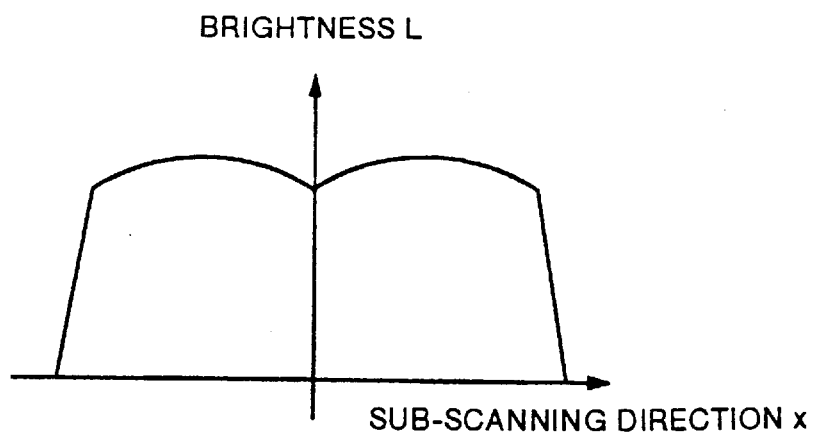
FIG. 28 is a document ground brightness histogram for one page of a document

FIG. 28 shows a ground brightness distribution of sub-scanning direction x (right and left side direction) for one page of a document. As a central part of a document has low height, it is far from an illumination device and an image reading unit, moreover it has an inclination on its surface, so the amount of document ground becomes small value. Further, as a right and left side of a document has low brightness because of faded color in addition to the above-mentioned reason of low height in its center, the ground brightness becomes low in the same manner.

Figure 29:
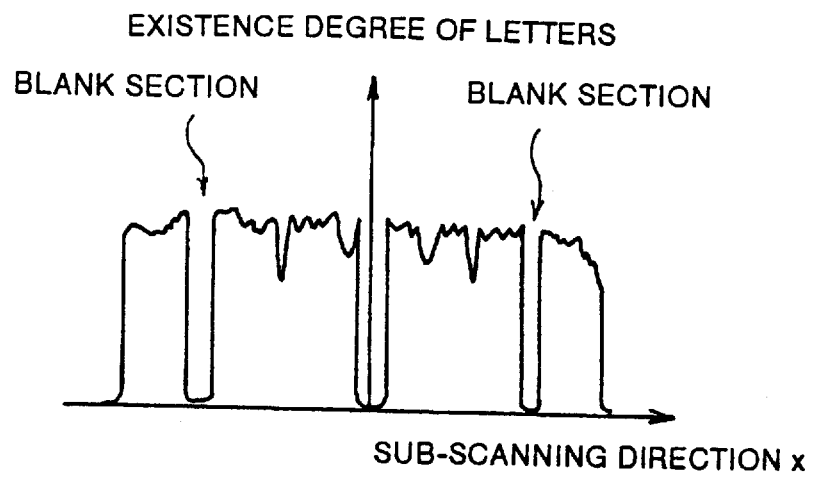
FIG. 29 is a view showing a state of distribution of existence degree of letters within a document.

FIG. 29 shows a distribution of the existence degree of letters within a document. In the main body section which document content is written, there is a lot of low brightness potion such as letters and pictures potion, so the existence degree of letters is high value. In the document center section, a break between paragraphs, and a margin section in right and left side, as a document content is not written there, the existence degree of letters is low value. Furthermore, the existence degree of letters is low value between sentences in a vertical writing.

Figure 30:
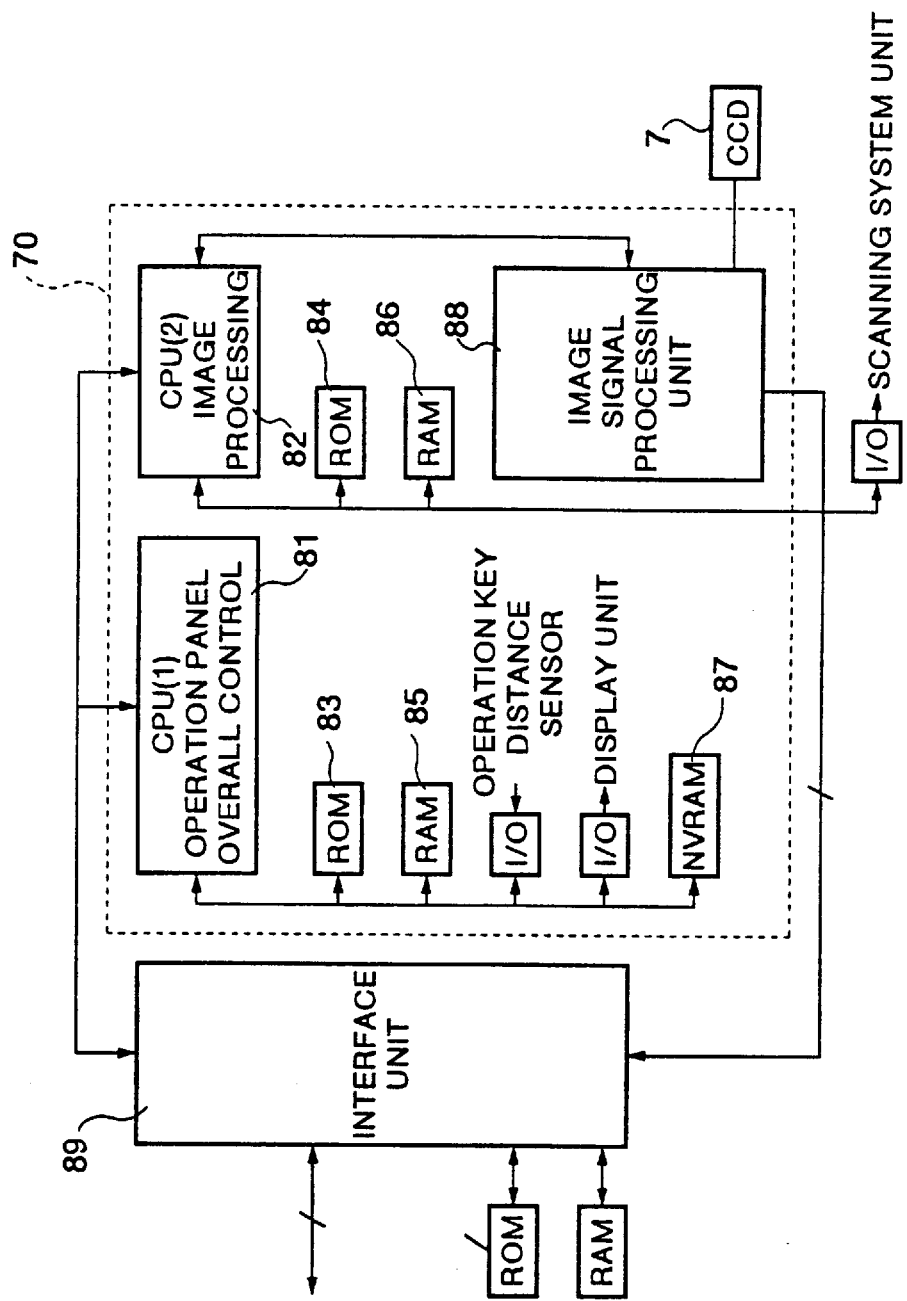
FIG. 30 is a block diagram of an overall construction of a control unit of the image reading apparatus according to the second embodiment.

A construction of a control unit will be now explained. FIG. 30 is a block view showing an overall construction of a control unit of the present invention according to the second embodiment. The control unit 70 contains two CPUs, a CPU (1) 81 and a CPU (2) 82, and the CPU (1) 81 contains ROM 83 which contains programs, and a RAM 85 which is a working area of executing the programs, and the CPU (2) 82 contains ROM 84 and RAM 85 which have the same workings as above mentioned. The CPU (1) 81 controls inputting with various operational keys of the operation panel and the sensor, and outputting a display to the display unit, and executes proceedings for adjusting a timing in whole and setting up operation modes. Moreover, an initial mode and a user mode, which are set up at the operation panel 4, are reserved in NVRAM 87. The CPU (2) 82 controls each section of an image signal processing 88, and controls driving of scanning system. An interface unit 89 outputs an image data from the image signal processing unit 88 to an external outputting apparatus through a popular interface such as SCSI.

Figure 31:
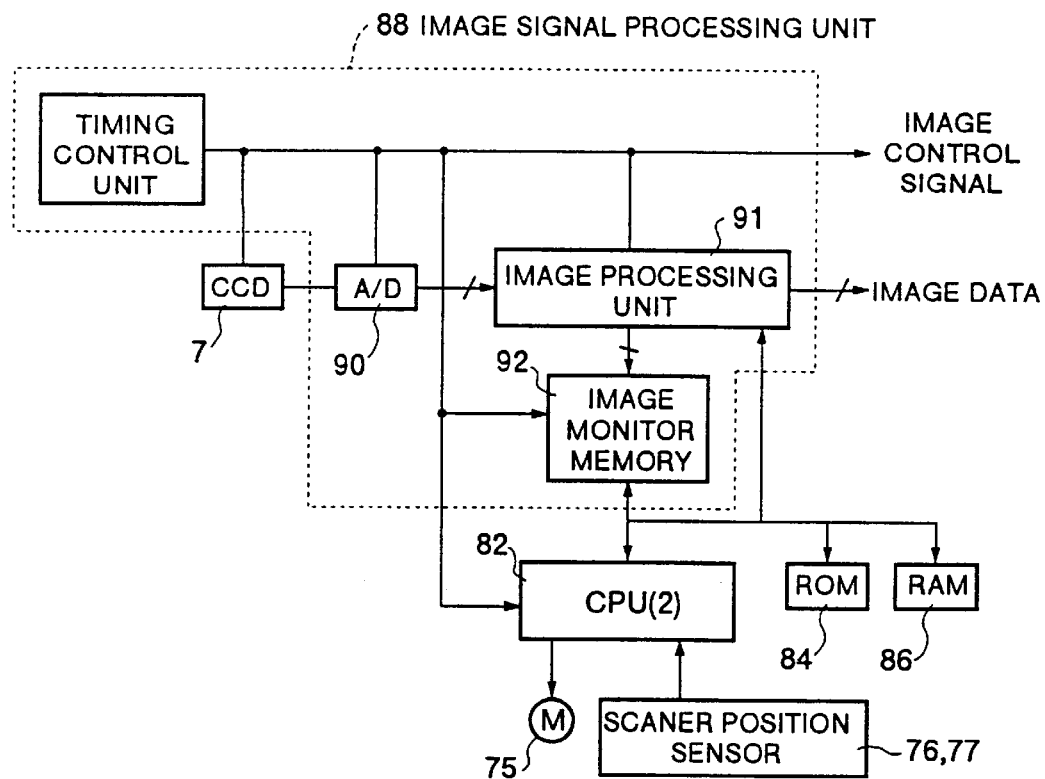
FIG. 31 is a block structural view of an image signal processing unit according to the second embodiment.

Next, an image signal processing unit 88 will be explained. FIG. 31 is a block structural view of an image signal processing unit 88. The CPU (2) 82, the ROM 84, RAM 86, and the line sensor 7 correspond to those on FIG. 30. Synchronization signal for image reading is supplied to each block from the CPU (1) 81. The line sensor 7 scans a document in main-scanning direction and produces a document reading signal. The produced signal is converted to a digital signal at an A/D converter unit 90, and sent to an image processing unit 91. When a sheetform document is read out, which passes through the document table, as the focal length becomes longer compared to the focal length on the document table, a resolution and magnification varies. Then, the image processing unit 91 executes correcting of a resolution and magnification in order to solve the problem, further, the image processing unit 91 executes an image condition correction such as shading correction as described later, MTF correction, γ-correction, and distortion rectification, and outputs the corrected data to the interface unit 89 as an image data. An image monitor memory unit 92 memorizes an image data for one line in accordance with a command by the CPU (2) 82, and based on the memorized image data, a document brightness and a distance to a document surface are detected. Moreover, the CPU (2) 82 sets up a parameter for the image processing unit 91 and controls a scanning executed by a scanner motor drive.

Figure 32:
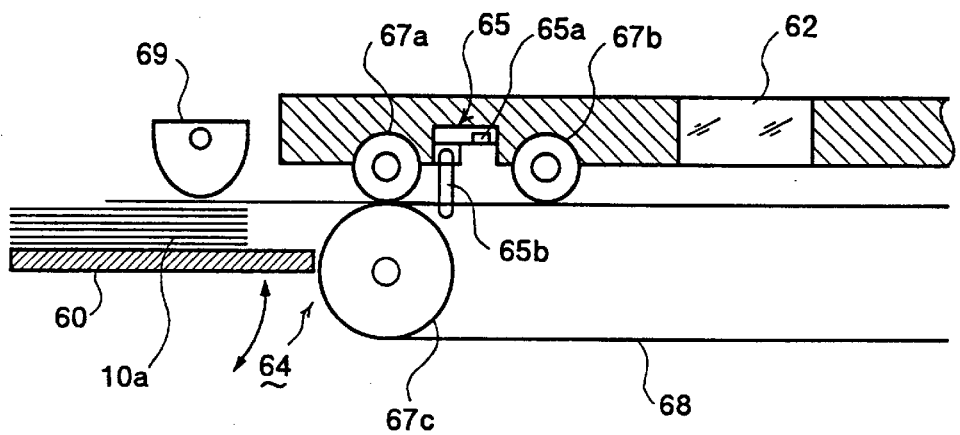
FIG. 32 is a structural view of an ADF (Auto Document Feeder) unit for a sheetform document.

Next, an auto-document feeding and conveyance of a sheetform document 64 will be explained referring to FIG. 32. The auto-document feeding and conveyance unit 64 contains a conveyance rollers 67a, 67b, and 67c, which are connected with a driving motor (not shown), and a conveyance belt 68 is driven by the conveyance roller 67c. A document feeding roller 69 has a half-moon shape, and conveys a paper of a sheetform document 64 on the ADF unit 60 to the conveyance roller 67a by rotating a round. Thereafter, a sheetform document 64 is conveyed to a printout tray by the conveyance belt 68. By moving the ADF unit 60 having an ADF tray downward (shown with an arrow in the figure), it secures a space between the ADF tray and the a document feeding roller 69 when a document is not fed and a document is returned at a pre-scanning. A document size detection sensor 65 is composed of a reflection type sensor 65a and an actuator 65b having a function of reflection board, and it enables judging whether a sheet is placed or not. The sensor 65 lies between the conveyance roller 67a and the conveyance roller 67b. A document image reading section 62 is arranged in a document feeding direction forehand the conveyance roller 67b.

Figure 33:
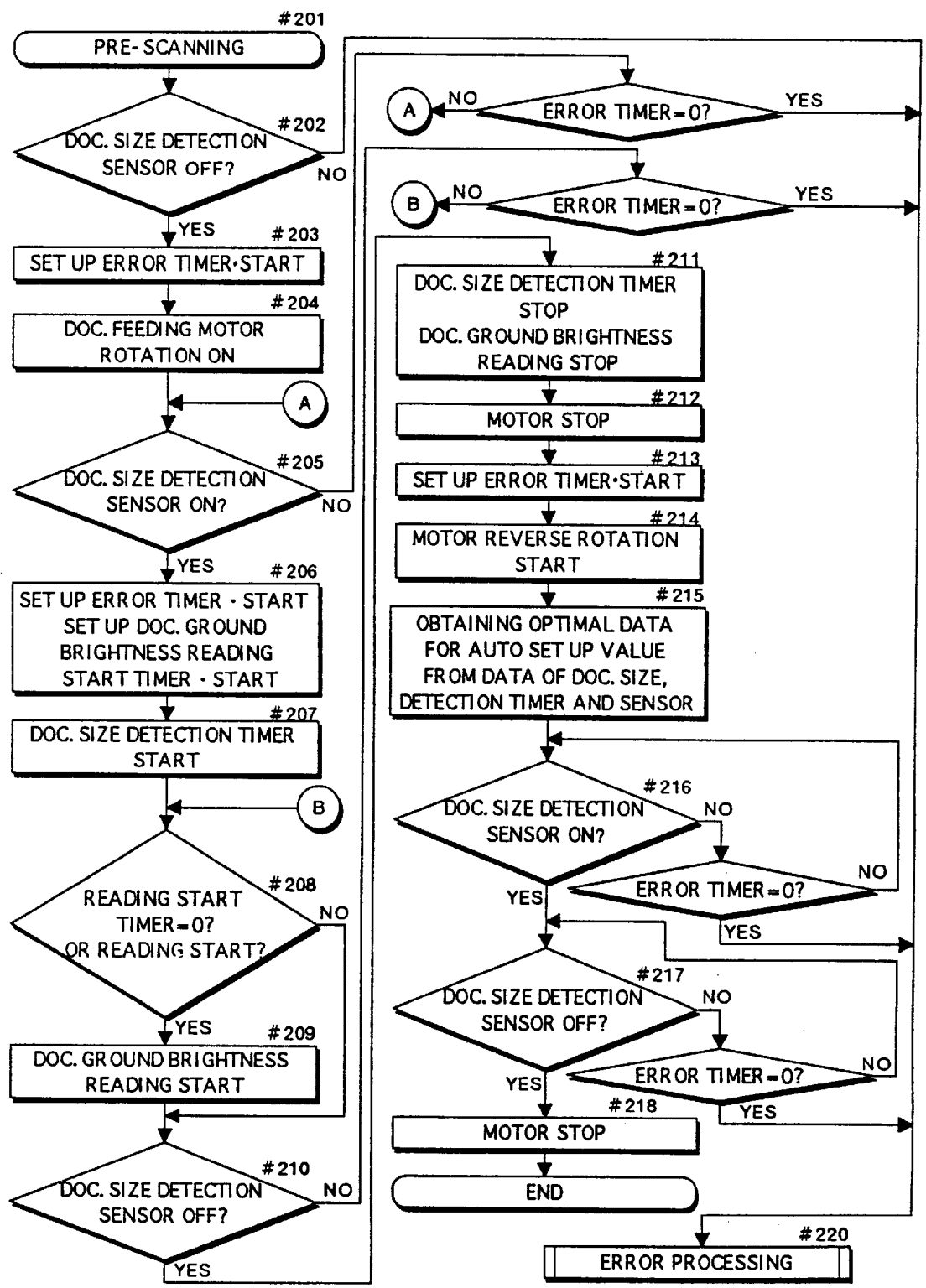
FIG. 33 is a flowchart showing a pre-scanning operation when a document is send out from the ADF unit.
Figure 34C:
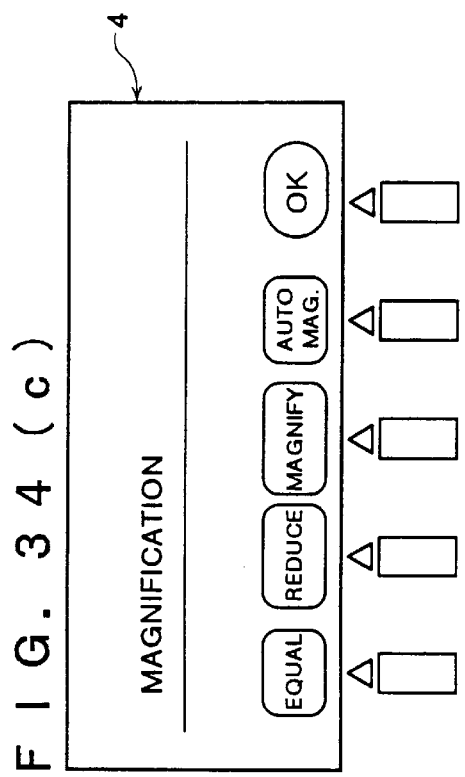
FIG. 34(a), FIG. 34(b), FIG. 34(c), and FIG. 34(d) are views showing an example of displaying of an operation panel according to the pond embodiment.
Figure 34D:
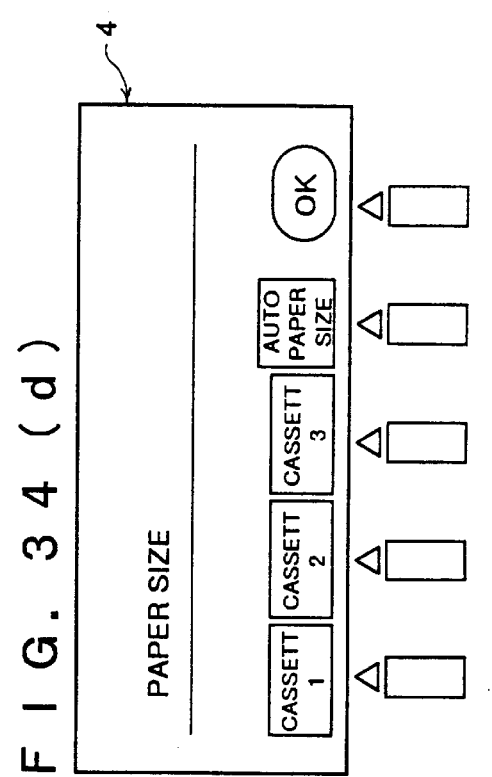
Figure 34A:
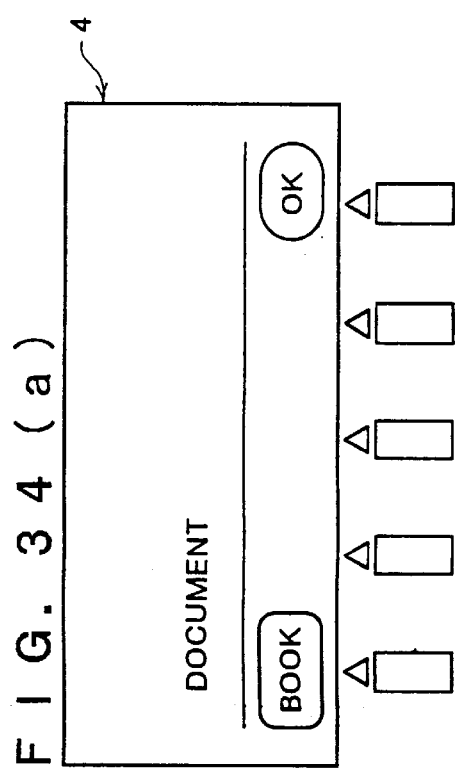
Figure 34B:
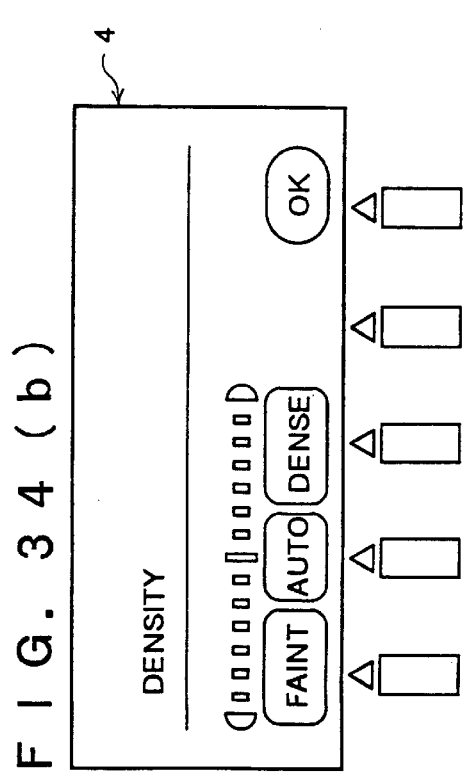

Now, the method of a pre-scanning (detection whether a document is placed, detection of document size in feeding direction, detection of document ground brightness) at auto-document feeding, will be explained. FIG. 33 is a flowchart showing a pre-scanning operation for document size detection in feeding direction. Here, a document size detection is executed in the manner as explained in FIG. 26. The pre-scanning operation in FIG. 33 is executed before copying the first paper of a sheetform document as described later. When the prescanning operation starts (#201) at a state that a sheetform document is placed on the ADF unit 60, with pushing a start button, it detects a state of a document size detection sensor 65 (#202), and if the sensor 65 is ON, it is judged as an error (#220). When it is not judged as an error, an error detection timer (a timer that detects whether a document is fed to the document size detection sensor 65) is set up, and started (#203), and a motor is rotated in an ordinary feeding direction (#204). When the document size detection sensor 65 is ON (#205), it sets up the error detection timer and a document ground brightness detection start timer (a timer so that the line sensor 7 is capable of reading out a document correctly, and also the area outside letters section) is set up, and it starts these timers (#206), and at the same time, the document size detection timer is started (#207). When the document ground brightness detection start timer is completed (#208), it starts image reading with the line sensor in order to detect a document ground brightness (#209).

Thereafter, it waits until the document size detection sensor 65 is OFF (#210), and when it is OFF, it stops the size detection timer and the document ground brightness detection operation (#211). Simultaneously, the motor is stopped (#212). Then it sets up the error detection timer and starts it (#213), and it rotates the motor in reverse direction so as to start setting back a document (#214). At the same time, it detects an optimal data (appropriate print paper size, proper magnification and density) for setting an auto setting up value based on a data of the document size detection timer and the data of image reading by the line sensor (#215). After it detects the document size detection sensor 65 and recognizes it is ON (#216), it waits until it recognizes the document size detection sensor 65 is OFF (#217), and when it is OFF, the motor is stopped (#218). Here, it does not need that a document is set back precisely. Moreover, when the error detection timer is completed during detecting a state of the document size detection sensor 65, it is judged that an error occurs (#220). The amount of conveying a document and the amount of putting back a document equals to the length of the document in feeding direction.

Figure 35:
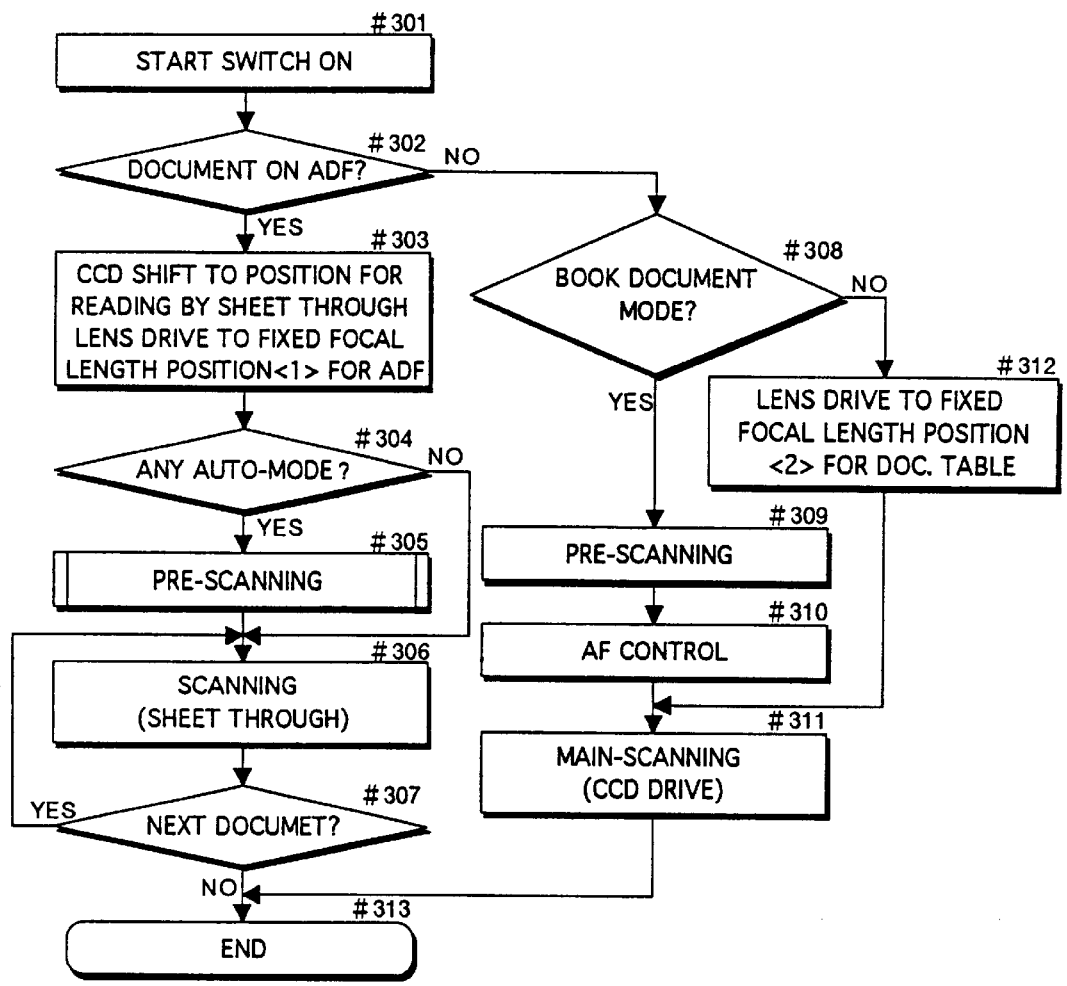
FIG. 35 is a flowchart of copying operation.

Now, a control of copying a sheetform document will be explained. FIG. 34 shows an operation panel 4 of the image reading apparatus. Even though a book-mode is selected in FIG. 34(a), if a document is placed on the ADF unit 60, the document on the ADF unit 60 is copied preferentially. When a document send out from the ADF unit 60 is copied, there are conditions to execute a pre-scanning (a document size detection operation), that is, a pre-scanning is executed when an auto-mode is selected at a density selection display in FIG. 34(b), or an auto-magnification mode is selected at a magnification selection display in FIG. 34(c), or an auto-document size mode is selected at a document size selection display in FIG. 34(d). FIG. 35 is a flowchart showing a control of copying a sheetform document.

In FIG. 35, when a start button is pushed (#301), it detected whether a document is placed or not on the ADF unit 60 (#302), and if it detects that there is a document, the line sensor 7 is driven to a reading position (7c in FIG. 21) of a document send out from the ADF unit 60 (#303). At the time, a photographing lens 6 is also driven to a fixed focal length <1> (6a in FIG. 21) for ADF. Then it judged whether any auto-modes is set up or not (#304), if an auto-mode has been set up, as it needs a pre-scanning for detecting a document size (proceeding as described in FIG. 33), a control of pre-scanning is executed, and then a data obtained by the pre-scanning is adopted as a data of mode setting (#305). After the pre-scanning, a scanning starts (sheet through) (#306). In this scanning, a resolution conversion and magnification correction is executed based on a resolution conversion data and a magnification correction data for reading out a document sent out from the ADF unit 60, and then a shading correction data 1, which is memorized in a SRAM 96 as described later, is output, and the image reading data is corrected. When any auto-modes is not selected, and a pre-scanning is unnecessary, a scanning is started immediately (#306). At the time, a document feeding speed varies in accordance to a magnification. A timing of image reading by the line sensor is controlled by a document reading start timer which is set up with document size detection sensor's ON. After scanning the first paper of a document, it detects whether there is next document or not, and if there is a next document, the scanning operation is repeated (#306, #307). If there is not any, the ADF operation is finished (#313).

On the other hand, when there is not any documents on the ADF unit 60 at #302, it detects whether a book-mode is selected manually at the operation panel 4 shown in FIG. 34(*a*) (#308), and if it is selected, a pre-scanning is executed (#309), and an optimal value, which is different from auto-modes, is set up, and an auto-focusing control is executed (#310). When a book-mode is not selected (#308, NO), it is judged the sheetform document mode is selected, and the photographing lens 6 is driven to a fixed focal length <2> (6*b* in FIG. 21) on the document table (#312). When an auto-mode is set up, a pre-scanning is executed, and it is not selected, a main-scanning (scanning by the line sensor movement) is executed without a pre-scanning (#311), and operations are finished (#313). At the time, as a shading correction, a correction data 2, which is memorized in a SRAM 96 as described later, is read out and an obtained imaged data is corrected.

Figure 36:
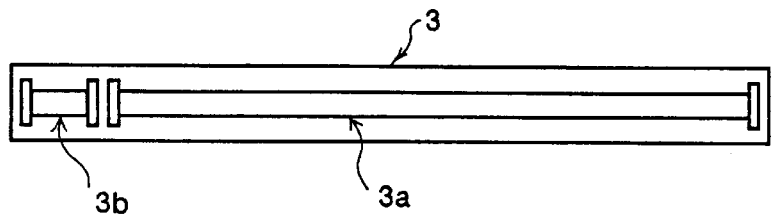
FIG. 36 is a structural view of a lamp unit according to the second embodiment.
Figure 37:
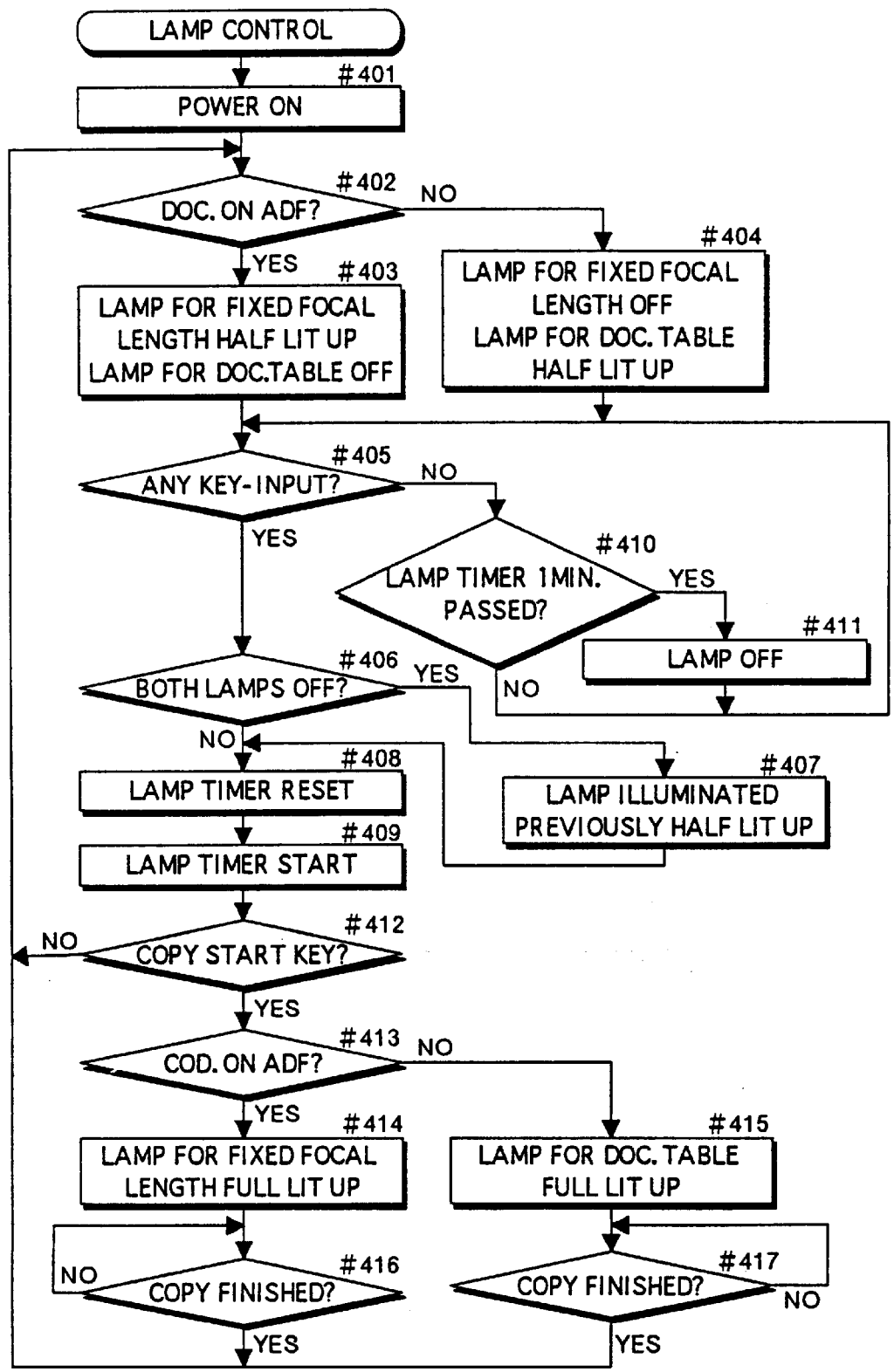
FIG. 37 is a flowchart showing a control of the lamp.

Now, a construction of the illumination unit 3 in the apparatus will be explained referring to FIG. 36. The illumination unit 3 is composed of a lamp unit, and a lamp 3*a* for document table and a lamp 3*b* for fixed focal length are arranged in series. By separating lamp in this manner, illuminating only one of lamps, and controlling them, it attempts to reduce a consumption of electricity and to extend a life of the lamp expectancy. In the mini-sized apparatus shown in FIG. 20, a construction of the illumination unit 3 has only a lamp for a document table. FIG. 37 is a flowchart showing a control of an illumination unit. After a power switch is ON (#401), it detects whether a document is placed on the ADF unit 60 (#402), and if there is a document, the lamp 3*b* for fixed focal length is half lit up (#403), and if there is not any, the lamp 3*b* is half lit up (#404). Then, when an inputting is done by keys (#405), unless a next input is executed by keys within one minute (#410, YES), the lamp is put off for reducing a consumption of electricity (#411). Here, a power-on operation is also regarded as a key operation. At inputting by keys, if both of lamps are put off (#406), the lamp, which has been lit until putting off the lamp, is half illuminated (#407). Then, after resetting a lamp timer (#408), the lamp timer is started (#409). At this time, when an inputting by keys is copy start (#412, YES), and if a document sent out from the ADF unit 60, is to be copied (#413, YES), the lamp 3*b* for a fixed focal length is illuminated fully (#414). If a document on the document table is to be copied (#413, NO), the lamp 3*a* for the document table is illuminated fully (#415). The full illumination is maintained until copying is completed (#416, #417). When copying is completed and when an inputting is done by keys except the copy start key, the procedure is returned to a state of detection whether a document is placed or not on the ADF unit 60 (#402). In the mini-sized apparatus shown in FIG. 20, as there is only one lamp, it does not execute selecting proceedings for illuminating lamp.

Figure 38:
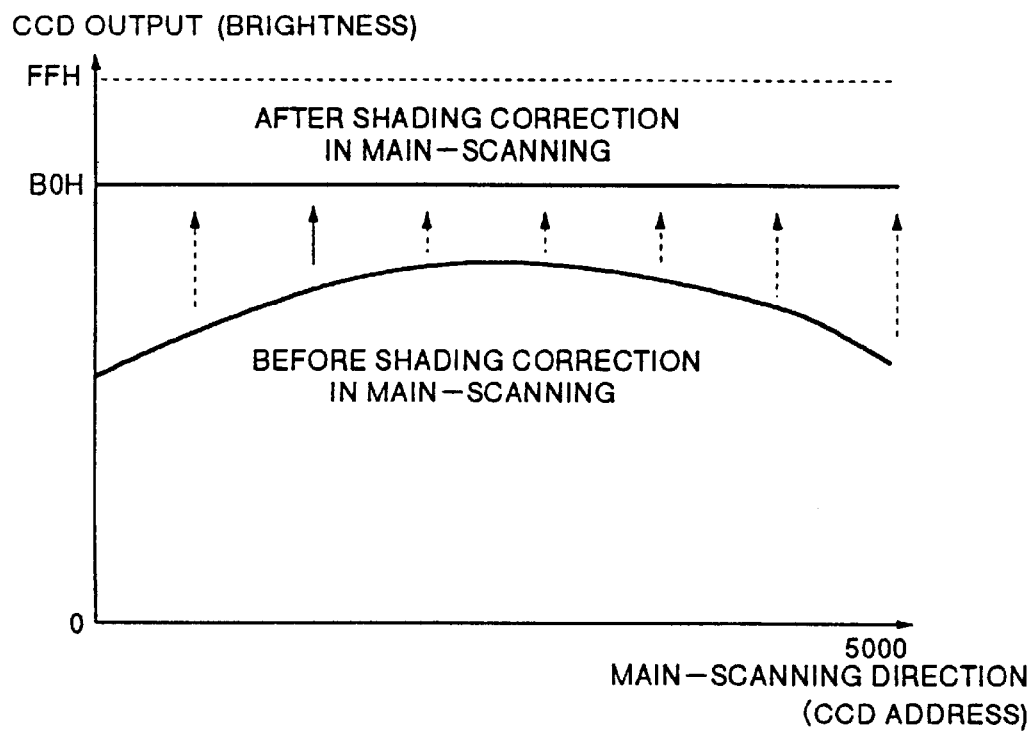
FIG. 38 is a view showing a principle of shading correction.
Figure 39:
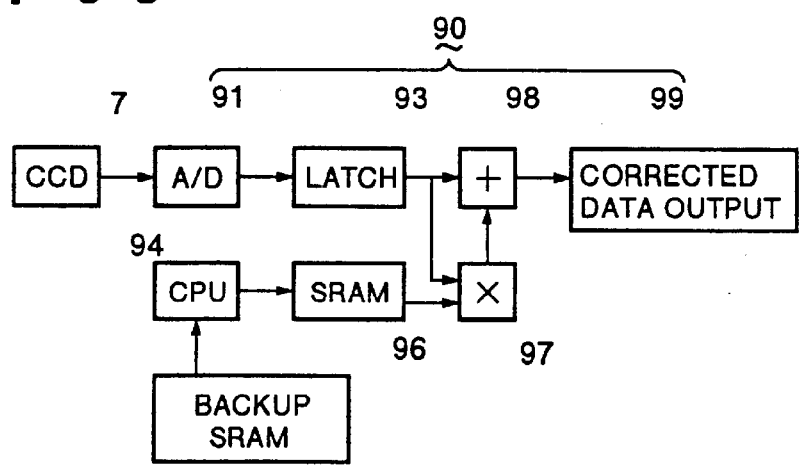
FIG. 39 is a circuit block diagram of shading correction in the image processing unit.

Now, a lamp illumination unevenness correction, i.e., a main-scanning shading correction will be explained. FIG. 38 is a view showing a principle of a shading correction. The correction is executed by an initial correction mode (not shown). An uneven brightness data in a main-scanning direction due to an uneven illumination, is reserved as a reference data for main-scanning shading in advance, and the main-scanning shading correction is executed electrically based on the data. FIG. 39 is a circuit block view for shading correction in an image processing unit 91. As for an inputting an initial correction data, it is set up at an operation panel as necessity requires, and it is operated. By this operation, a reference data for main-scanning shading is prepared, and it is inputted to an internal SRAM 95 for backing up. Once a shading data is inputted, in following operations, the inputted data is inputted from the SRAM 95 to the SRAM 96 when a power switch is ON. Then, at each scanning, an analog signal from the line sensor 7 is converted from analog to digital (91), and a correction value which corresponds to the line sensor address (97) is inputted from the SRAM 96 at a latch time of a predetermined cycle, and the correction data and the inputted data is composed (98), and then the composed data becomes an output data after correction (99).

In the initial correction mode as mentioned above, a white plate 66*a* shown in FIG. 22 is come out as illustrated in the figure, and it is illuminated by a lamp, and an image reading is executed by the line sensor 7, and a correction data at this point is memorized in the SRAM 95 (a correction data). When the correction mode is completed, the white plate 66*a* is pulled in as shown in dotted line, and it does not give any influence in reading out at image inputting. Further, as for a shading data at reading out a bookform document, a white plate with the same size as a document table 1 is placed at a fixed position on the document table 1, and the line sensor 7 is moved to scan with lamp illumination, and a data of one line is picked up, and then a two-dimensional shading data is obtained due to an uneven lamp illumination and a difference of the line sensor characteristic. This data is also memorized in the SRAM 95 (correction data 2).

The present invention may be embodied in other specific forms without departing from the spirit or essential characteristics thereof. The present embodiment is therefore to be considered in all respects as illustrative and not restrictive. For example, although a CCD line sensor is applied as an image pickup device according to the above embodiments of the present invention, an area sensor can be substituted.

What is claimed is:

1. An image reading apparatus which reads a document surface placed face-up on a document table, and controls an image density based on document ground brightness data obtained by reading the document, and said image reading apparatus, comprising:

an image pickup device for picking up the document;

a main-scanning means for reading out the document by scanning of the image pickup device, and outputting the image data;

a pre-scanning means for reading out the document by scanning of the image pickup device before the main-scanning operation, and obtaining a data of document ground brightness;

a memory means for memorizing the ground brightness data obtained by the pre-scanning means;

a document change detection means for detecting whether a document is changed or not;

a density control means for controlling a density of the image obtained by the main-scanning means based on the ground brightness data memorized in the memory means; and, a control means for controlling the pre-scanning means and a memory means so that a pre-scanning is not executed and the data memorized in the memory means is not renewed when a document change is not detected by the document change detection means, and so that a pre-scanning is executed and the data memorized in the memory means is renewed when a document change is detected by the document change detection means.

2. An image reading apparatus which reads a document surface placed face-up on a document table, and controls an image density based on document ground brightness data obtained by reading the document, and said image reading apparatus, comprising:

an image pickup device;

an image reading means for reading out a document image by the image pickup device;

a ground brightness detection means for detecting a document ground brightness;

a memory means for memorizing the ground brightness data obtained by the ground brightness detection means;

a document change detection means for detecting whether a document is changed or not;

a density control means for controlling a density of the image read out by the image reading means based on the ground brightness data memorized in the memory means; and, a control means for controlling the memory means so that the data memorized in the memory means is renewed when a document change is detected by the document change detection means.

3. An image reading apparatus which reads a document surface placed face-up on a document table, and controls an image density based on document ground brightness data obtained by reading the document, and said image reading apparatus, comprising:

an image pickup device;

a main-scanning means for reading out the document by scanning of the image pickup device, and outputting the image data;

a pre-scanning means for reading out the document by scanning of the image pickup device before the main-scanning operation, and obtaining a data of document ground brightness;

a memory means for memorizing the ground brightness data obtained by the pre-scanning operation;

a page turned detection means for detecting a predetermined amount of page is turned over;

a density control means for controlling a density of the image obtained by the main-scanning operation based on the ground brightness data memorized in the memory means; and, a control means for controlling the pre-scanning means and the memory means so that the pre-scanning is not executed and the data memorized in the memory means is not renewed when it is detected that a predetermined amount of page is not turned over by the page turned detection means, and so that a pre-scanning is executed and the data memorized in the memory means is renewed when it is detected that a predetermined amount of page is turned over.

4. An image reading apparatus which reads a document surface placed face-up on a document table, and controls an image density based on document ground brightness data obtained by reading the document, and said image reading apparatus, comprising:

an image pickup device;

an image reading means for reading out the document image by the image pickup device;

a ground brightness detection means for detecting a ground brightness of a document;

a memory means for memorizing the ground brightness data obtained by the ground brightness detection operation;

a page turned detection means for detecting a predetermined amount of page is turned over;

a density control means for controlling a density of the image read out by the image reading operation based on the ground brightness data memorized in the memory means; and, a control means for controlling the memory means so that the data memorized in the memory means is renewed when it is detected that a predetermined amount of page is turned over by the page turned detection means.

5. An image reading apparatus which reads a document surface to output an image data therefrom, and rectifies the image data based on a correction data obtained by reading the document, and said image reading apparatus comprising:

an image pickup device;

a main-scanning means for reading out the document by scanning of the image pickup device, and outputting the image data;

a pre-scanning means for reading out the document by scanning of the image pickup device before the main-scanning operation, and obtaining a correction data of the document;

a memory means for memorizing the correction data obtained by the pre-scanning operation;

an abnormality detection means for detecting if an abnormality occurs concerning the correction data;

an image rectification means for rectifying the image obtained by the main-scanning operation based on the correction data memorized in the memory means; and, a control means for controlling the pre-scanning means and a memory means so that the pre-scanning is not executed and the data memorized in the memory means is renewed when an abnormality is not detected by the abnormality detection means, and so that a pre-scanning is executed and the data memorized in the memory means is renewed when an abnormality is detected.

6. An image reading apparatus which reads a document surface to output an image data therefrom, and rectifies the image data based on a correction data obtained by reading the document, and said image reading apparatus, comprising:

an image pickup device;

an image reading means for reading out the document image by the image pickup device;

a memory means for memorizing a correction data for rectifying an image data obtained by the image reading operation;

an abnormality detection means for detecting of an abnormality occurs concerning the correction data;

an image rectification means for rectifying the image obtained by the image reading operation based on the correction data; and, a control means for controlling the memory means so that the data memorized in the memory means is renewed when an abnormality is detected by the abnormality detection means.

7. An image reading apparatus which reads a document surface to output an image data therefrom, and rectifies the image data based on a correction data obtained by reading the document, and said image reading apparatus, comprising:

an image pickup device;

a main-scanning means for reading out the document by scanning of the image pickup device, and outputting the image data;

a pre-scanning means for reading out the document by scanning of the image pickup device before the main-scanning operation, and obtaining a correction data of the document;

a memory means for memorizing the correction data;

an image rectification means for rectifying the image obtained by the main-scanning operation based on the correction data memorized in the memory means;

a data set up means for setting up a correction data that is to be memorized in the memory means by a manual operation; and, a control means for controlling the pre-scanning means and the main-scanning means so that a pre-scanning is not executed and a main-scanning is executed when a correction data is set up in the data set up means.

8. An image reading apparatus as defined in claim 7, wherein the image pickup device is arranged above a document table and picks up a document which is placed face-up on the document table.

9. An image reading apparatus which reads out a book-form document and a sheetform document, and outputs the image data of the same, and said image reading apparatus comprising:

an image pickup device for picking up the document image;

an auto document feeder for feeding a sheetform document to a document reading position;

a main-scanning means for reading out the document by scanning of the image pickup device, and outputting the image data;

a pre-scanning means for reading out the document by scanning of the image pickup device before the main-scanning operation, and obtaining a correction data;

a memory means for memorizing the correction data obtained by the pre-scanning operation;

an image rectification means for rectifying the image data obtained by the main-scanning operation based on the correction data; and, a control means for controlling the pre-scanning means and the main-scanning means so that a main-scanning is only executed without executing a pre-scanning when the second paper of the sheetform document is read out.

10. An image reading apparatus as defined in claim 9, wherein the control means controls a pre-scanning means so that a pre-scanning is not executed for papers after the second paper of a sheet document.

11. An image reading apparatus as defined in claim 9, further comprising, a document judgment means for judging whether a document is sheetform or bookform; and, said control means controls the pre-scanning means so that a pre-scanning is executed at every time before a main-scanning operation when a document is judged as bookform by the document judgment means.

12. An image reading apparatus as defined in claims 9, 10, or 11, wherein the image pickup device is arranged above a document table, and picks up a document which is placed face-up on the document table.

13. An image reading apparatus which reads out a book-form document and a sheetform document, and outputs the image data of the same, and said image reading apparatus:

an image pickup device for picking up the document;

an auto-document feeder for feeding a sheetform document to a document reading position;

a main-scanning means for reading out the document by scanning of the image pickup device, and outputting the image data;

a pre-scanning means for reading out the document by scanning of the image pickup device before the main-scanning operation, and obtaining a correction data;

a memory means for memorizing the correction data obtained by the pre-scanning operation;

an image rectification means for rectifying the image data obtained by the main-scanning operation based on the correction data;

a document judgment means for judging whether a document is sheetform or bookform; and, a control means for controlling the pre-scanning means whether a pre-scanning is to be executed or not in accordance with a kind of a document that is judged by the document judgment means.

14. An image reading apparatus as defined in claim 13, wherein the document judgment means is for judging whether a document is sheetform or bookform, and it is judged as a sheetform document when a document is placed on the auto-document feeder.

15. An image reading apparatus as defined in claim 13, wherein the control means controls a pre-scanning means so that a pre-scanning is executed when a document is bookform, and a pre-scanning is executed when it is sheetform.

16. An image reading apparatus as defined in claim 13, wherein the control means controls a pre-scanning means so that a pre-scanning is executed even thought a document is sheetform or bookform.

17. An image reading apparatus as defined in claim 13 further comprising, a distance measuring means for detecting a distance between the document surface and the image pickup device, a lens for focusing a document image on the image pickup device, and a focus condition adjusting means for driving the lens in accordance with a result of a distance detected by the distance measuring detection means; and, said control means controls the focus condition control means so that the lens is driven to a fixed focal position adopted, not based on the result of a distance detected when a document is sheetform.

18. An image reading apparatus as defined in claim 17, wherein the fixed focal position includes a plural position, and either one's position to be adopted is selected in accordance with a time when a bookform document is placed on the auto document feeder and when a sheetform document is placed on the document table where a bookform document is to be placed.

* * * * *